US012776579B2

(12) United States Patent
Tamashiro et al.

(10) Patent No.: US 12,776,579 B2
(45) Date of Patent: Oct. 27, 2026

(54) ANTENNA DEVICE

(71) Applicant: TOKIN CORPORATION, Shiroishi (JP)

(72) Inventors: Katsuaki Tamashiro, Sendai (JP); Norimitsu Hoshi, Sendai (JP); Toshiaki Oka, Sendai (JP)

(73) Assignee: TOKIN CORPORATION, Shiroishi (JP)

( * ) Notice: Subject to any disclaimer, the term of this patent is extended or adjusted under 35 U.S.C. 154(b) by 4 days.

(21) Appl. No.: 18/858,402

(22) PCT Filed: Apr. 27, 2023

(86) PCT No.: PCT/JP2023/016764

§ 371 (c)(1),
(2) Date: Oct. 21, 2024

(87) PCT Pub. No.: WO2023/210784

PCT Pub. Date: Nov. 2, 2023

(65) Prior Publication Data

US 2025/0286278 A1 Sep. 11, 2025

(30) Foreign Application Priority Data

Apr. 28, 2022 (JP) ................................ 2022-074955
Jul. 26, 2022 (JP) ................................ 2022-118580

(51) Int. Cl.
*H01Q 7/06* (2006.01)

(52) U.S. Cl.
CPC .................................... *H01Q 7/06* (2013.01)

(58) Field of Classification Search
None
See application file for complete search history.

(56) References Cited

U.S. PATENT DOCUMENTS 8,976,075 B2 3/2015 Kato et al.
9,582,693 B2 2/2017 Yosui et al.
(Continued)

FOREIGN PATENT DOCUMENTS

CN 106207441 A 12/2016
JP H0289698 A * 3/1990
(Continued)

OTHER PUBLICATIONS

Japanese Office Action (and an English language translation thereof) dated Jan. 11, 2023, issued in Japanese Application No. 2022-118580.

(Continued)

*Primary Examiner* — Anh Q Tran
(74) *Attorney, Agent, or Firm* — Holtz, Holtz & Volek PC

(57) ABSTRACT

An antenna device includes a circuit board, a coil antenna and a resonance circuit. The circuit board has a conductive portion with a flat shape. The conductive portion is formed with an opening and a slit. The slit is coupled with the opening. The coil antenna is mounted on the circuit board so that the coil antenna at least overlaps with the opening when the coil antenna is viewed along an up-down direction perpendicular to the circuit board. The coil antenna includes a coil and a magnetic core. The magnetic core partially forms a magnetic path of the coil. The magnetic core is positioned at a region excluding a specific region which is positioned just below the coil. The magnetic core at least has a center core. The center core is at least partially positioned inside the coil.

16 Claims, 16 Drawing Sheets

(56) References Cited

U.S. PATENT DOCUMENTS

| | | | | |
|---|---|---|---|---|
| 10,931,015 | B2 | 2/2021 | Tenno | |
| 2007/0051807 | A1 | 3/2007 | Yamaguchi | |
| 2013/0307746 | A1 * | 11/2013 | Nakano | G06K 7/10178 343/866 |
| 2014/0198006 | A1 | 7/2014 | Nakano | |
| 2014/0203991 | A1 * | 7/2014 | Yosui | G06K 19/07749 343/866 |
| 2019/0372202 | A1 * | 12/2019 | Lee | H01Q 7/06 |

FOREIGN PATENT DOCUMENTS

| | | | |
|---|---|---|---|
| JP | 4687832 | B2 | 5/2011 |
| JP | 2014075775 | A | 4/2014 |
| JP | 5549788 | B2 | 5/2014 |
| JP | 5578291 | B2 | 8/2014 |
| JP | 6493801 | B2 * | 4/2019 |
| JP | 6566184 | B1 | 8/2019 |
| WO | 2005017821 | A1 | 2/2005 |
| WO | 2013115148 | A1 | 8/2013 |

OTHER PUBLICATIONS

International Search Report (ISR) (and English language translation thereof) dated Jul. 18, 2023, issued in International Application No. PCT/JP2023/016764.

Written Opinion dated Jul. 18, 2023, issued in International Application No. PCT/JP2023/016764.

Extended European Search Report (EESR) dated Jun. 5, 2025, issued in counterpart European Application No. 23796519.9.

Japanese Office Action (and an English language translation thereof) dated Feb. 26, 2026, issued in counterpart Japanese Application No. 2023-089919.

* cited by examiner

ANTENNA DEVICE

TECHNICAL FIELD

This invention relates to an antenna device comprising a circuit board and a coil antenna.

BACKGROUND ART

As shown in FIG. 31, an antenna device 900 of this type is disclosed in Patent Document 1. The antenna device 900 can be used for communications such as NFC (Near field communication) or RFID (radio frequency identifier). The antenna device 900 comprises a circuit board 910, a first coil antenna (coil antenna) 930 and a second coil antenna (coil antenna) 940. As shown in FIG. 32, a first principal surface 920 of the circuit board 910 is formed with a planar conductor (conductive portion) 922. The conductive portion 922 is formed with a first opening (opening) 9222, a second opening (opening) 9224, a first slit (slit) 9223 and a second slit (slit) 9225. The slit 9223 is coupled with the opening 9222. The slit 9225 is coupled with the opening 9224. Referring to FIGS. 31 and 32, the coil antenna 930 is mounted on the circuit board 910 so that the coil antenna 930 overlaps with the opening 9222 when the coil antenna 930 is viewed along a direction perpendicular to the circuit board 910, or along a Z-direction. The coil antenna 940 is mounted on the circuit board 910 so that the coil antenna 940 overlaps with the opening 9224 when the coil antenna 940 is viewed along the direction perpendicular to the circuit board 910, or along the Z-direction. Each of the coil antennas 930, 940 comprises a coil (not shown) and a laminated body (not shown). Specifically, the coil has a winding axis extending in a direction perpendicular to the first principal surface 920, or in the Z-direction, and the laminated body is formed by laminating insulation base layers each made of magnetic ferrite or the like.

PRIOR ART DOCUMENTS

Patent Document(s)

Patent Document 1: JP-B 6566184

SUMMARY OF INVENTION

Technical Problem

An antenna device such as the antenna device 900 of Patent document 1 is required to have further enhanced antenna characteristics.

It is therefore an object of the present invention to provide an antenna device having further enhanced antenna characteristics.

Solution to Problem

In a coil antenna whose coil is completely embedded in a magnetic core, a closed magnetic path is formed by the magnetic core. The inventors of the present invention have noticed that, when an antenna device such as the antenna device 900 is formed by such a coil antenna, magnetic flux generated by a coil passes in a closed magnetic path formed by a magnetic core and this weakens coupling of a current-loop, which flows at an outer periphery of a slit of a circuit board, with the coil antenna. Then, the inventors of the present invention have conceived that an antenna device is configured to have an open magnetic path, through which magnetic flux generated by a coil of a coil antenna passes, by a magnetic core being at least not positioned just below the coil of the coil antenna. The inventors of the present invention have found that this new configuration can strengthen coupling of a current-loop, which flows at an outer periphery of a slit of a circuit board, with the coil antenna. The present invention is based on this finding.

An aspect of the present invention provides, as a first antenna device, an antenna device comprising a circuit board, a coil antenna and a resonance circuit, wherein:

- the circuit board has a conductive portion with a flat shape;
- the conductive portion is formed with an opening and a slit;
- the conductive portion has a first path which goes around the opening and the slit;
- the first path forms a part of the resonance circuit;
- the slit is coupled with the opening;
- the coil antenna is mounted on the circuit board so that the coil antenna at least overlaps with the opening when the coil antenna is viewed along an up-down direction perpendicular to the circuit board;
- the coil antenna comprises a coil and a magnetic core;
- the coil has a winding axis extending in the up-down direction;
- the magnetic core partially forms a magnetic path of the coil;
- the magnetic core is positioned at a region excluding a specific region which is positioned just below the coil;
- the magnetic core at least has a center core; and
- the center core is at least partially positioned inside the coil.

Advantageous Effects of Invention

The antenna device of the present invention is configured as follows: the coil antenna is mounted on the circuit board so that the coil antenna at least overlaps with the opening when the coil antenna is viewed along the up-down direction perpendicular to the circuit board; the magnetic core is positioned at the region excluding the specific region which is positioned just below the coil; the magnetic core at least has the center core; and the center core is at least partially positioned inside the coil. This strengthens coupling of a current-loop, which flows at an outer periphery of the slit of the circuit board, with the coil antenna in the antenna device of the present invention. In other words, the antenna device of the present invention has further enhanced antenna characteristics.

An appreciation of the objectives of the present invention and a more complete understanding of its structure may be had by studying the following description of the preferred embodiment and by referring to the accompanying drawings.

DESCRIPTION OF EMBODIMENTS

Figure 1:
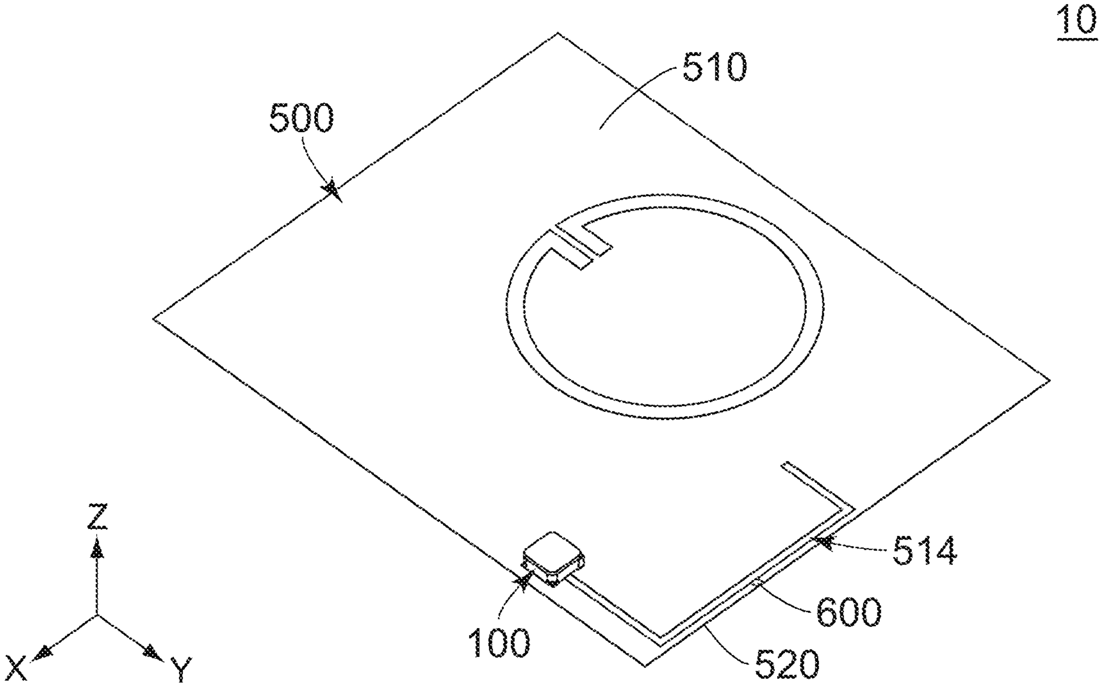
FIG. 1 is a perspective view showing an antenna device according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

First Embodiment

As shown in FIG. 1, an antenna device 10 according to a first embodiment of the present invention comprises a circuit board 500, a coil antenna 100 and a resonance circuit.

Figure 12:
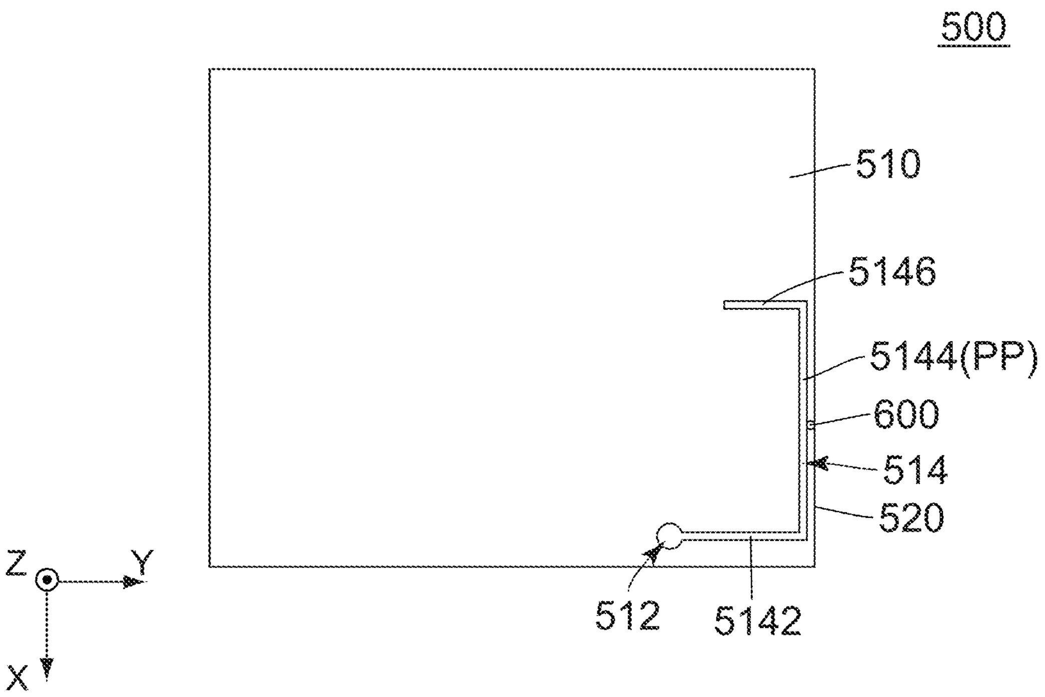
FIG. 12 is a top view showing a circuit board which is included in the antenna device of FIG. 2.

As shown in FIG. 12, the circuit board 500 of the present embodiment has a conductive portion 510 with a flat shape. In more detail, the conductive portion 510 is a ground conductor. Specifically, the circuit board 500 is configured so that a conductive layer, which functions as the conductive portion 510, is laminated on an insulating substrate such as a glass epoxy substrate.

As shown in FIG. 12, the conductive portion 510 is formed with an opening 512 and a slit 514. The conductive portion 510 has a first path which goes around the opening 512 and the slit 514. The first path forms a part of the resonance circuit.

Referring to FIG. 12, the opening 512 of the present embodiment is a part of the circuit board 500 which has no conductive pattern. The opening 512 has an outer edge which has a substantially circular shape when the circuit board 500 is viewed from above in an up-down direction. However, the present invention is not limited thereto, but the opening 512 may have an outer edge with a shape other than the substantially circular shape. In the present embodiment, the up-down direction is a Z-direction. Specifically, it is assumed that upward is a positive Z-direction while downward is a negative Z-direction.

As shown in FIG. 12, similar to the opening 512, the slit 514 of the present embodiment is a part of the circuit board 500 which has no conductive pattern. The slit 514 is coupled with the opening 512. The slit 514 extends from the opening 512. In the present embodiment, the number of the slit 514 extending from the opening 512 is one. However, the present invention is not limited thereto, but a plurality of the slits 514 may extend from the opening 512. The slit 514 does not communicate with the outside of the conductive portion 510 in a plane perpendicular to the up-down direction. The slit 514 has a predetermined portion PP. The slit 514 has a first portion 5142 and a second portion 5144.

As shown in FIG. 12, a width of the slit 514 is smaller than a diameter of the opening 512. However, the present invention is not limited thereto, but the width of the slit 514 may be equal to the diameter of the opening 512, or the width of the slit 514 may be greater than the diameter of the opening 512. It is noted that an increase of the width of the slit 514 enlarges a current loop, which is formed around the slit 514, so that a communication range of the antenna device 10 is increased.

As shown in FIG. 12, the first portion 5142 extends rightward in a right-left direction from the opening 512. In the present embodiment, the right-left direction is a Y-direction. Specifically, rightward is a positive Y-direction while leftward is a negative Y-direction.

As shown in FIG. 12, the second portion 5144 extends from the first portion 5142 in a direction intersecting with the first portion 5142. The second portion 5144 extends rearward in a front-rear direction from a right end of the first portion 5142. In the present embodiment, the front-rear direction is an X-direction. Specifically, forward is a positive X-direction while rearward is a negative X-direction. The second portion 5144 functions as the predetermined portion PP.

As shown in FIG. 12, the slit 514 further comprises a third portion 5146.

As shown in FIG. 12, the third portion 5146 extends from the second portion 5144 in a direction intersecting with the second portion 5144. The third portion 5146 extends leftward in the right-left direction from a rear end of the second portion 5144.

As shown in FIG. 12, the circuit board 500 has an edge 520.

As shown in FIG. 12, the edge 520 defines an outer edge of the circuit board 500. Specifically, the edge 520 defines the outer edge of the circuit board 500 in a direction perpendicular to the up-down direction. The slit 514 extends from the opening 512 toward the edge 520, and is bent so that it extends along the edge 520, and is further bent so that it extends away from the edge 520. The slit 514 does not reach the edge 520. The first portion 5142 extends from the opening 512 toward the edge 520. The predetermined portion PP extends along the edge 520 in the vicinity of the edge 520. This configuration enables the circuit board 500 to have an increased region where electronic components can be arranged on the circuit board 500, and the communication range of the antenna device 10 can be increased by enlarging the current loop, which is formed around the slit 514, because this configuration can increase a length of the slit 514.

As described above, the slit 514 extends from the opening 512 toward the edge 520, and is bent so that it extends along the edge 520, and is further bent so that it extends away from the edge 520. Additionally, as described above, the slit 514 does not reach the edge 520 and does not communicate with the outside of the conductive portion 510 in the plane perpendicular to the up-down direction. However, the present invention is not limited thereto, but the slit 514 may extend toward the edge 520 and may reach the edge 520. Specifically, the slit 514 may communicate with the outside of the conductive portion 510 in the plane perpendicular to the up-down direction.

Figure 2:
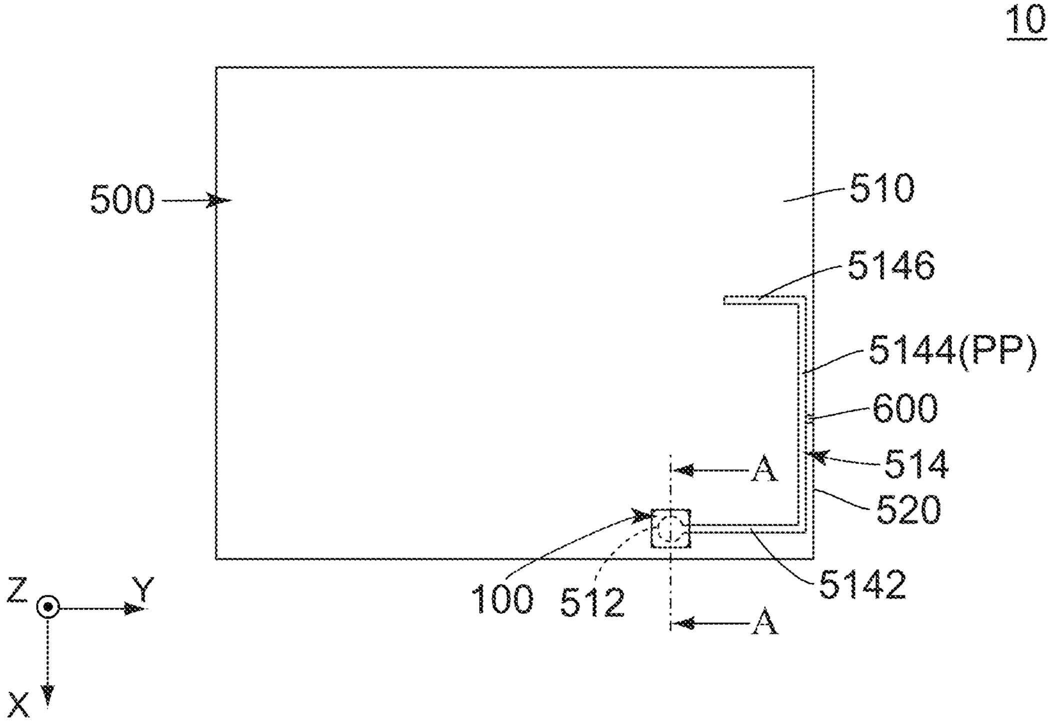
FIG. 2 is a top view showing the antenna device of FIG. 1.

Referring to FIGS. 2 and 12, the coil antenna 100 is mounted on the circuit board 500 so that the coil antenna 100 at least overlaps with the opening 512 when the coil antenna 100 is viewed along the up-down direction perpendicular to the circuit board 500. The coil antenna 100 is surface-mounted on the circuit board 500. In other words, the coil antenna 100 is a surface mount antenna.

Figure 3:
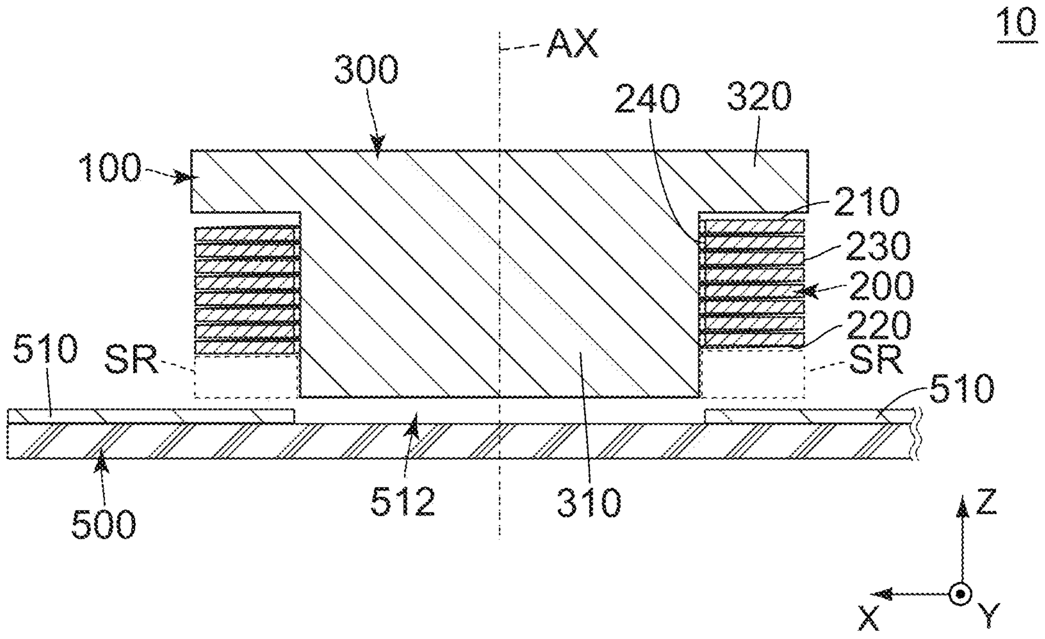
FIG. 3 is a cross-sectional view showing a part of the antenna device of FIG. 2, taken along line A-A. In the figure, a molded resinous member, terminals and pads are omitted.

As shown in FIG. 3, the coil antenna 100 comprises a coil 200 and a magnetic core 300.

As shown in FIG. 3, the coil 200 of the present embodiment has a winding axis AX which extends in the up-down direction. This coil 200 is formed by winding a jacketed flat electrical cable edgewise. However, the present invention is not limited thereto, but the coil 200 may be formed by winding a jacketed round electrical cable, and a material of the conductive cable, a cross-section of the conductive cable and a manner of winding the conductive cable are not limited to the present embodiment. The coil 200 has a ring shape when viewed along the up-down direction. However, the present invention is not limited thereto, but the coil 200 may have a shape other than the ring shape. The coil 200 has an upper end 210 and a lower end 220 in the up-down direction. The coil 200 has an inner periphery 240 and an outer periphery 230.

Referring to FIGS. 3 and 12, S1 and S2 satisfy $1 \leq S2/S1 \leq 2$, where S1 is a cross-sectional area of the inner periphery 240 of the coil 200, and S2 is an area of the opening 512. This can maximize a coupling coefficient between the coil antenna 100 and the slit 514, and thereby the coil antenna 100 can easily be electromagnetically coupled with a current (current loop) which goes around the opening 512 and the slit 514 of the conductive portion 510.

Referring to FIG. 3, the magnetic core 300 of the present embodiment is a cast core. More specifically, the magnetic core 300 is a composite magnet in which soft magnetic particles made of ferrous alloy, ferrite or the like are dispersed in a hardened binder. In other words, the magnetic core 300 is formed by hardening a slurry which includes the soft magnetic particles and the binder or the like. It is noted that a method of manufacturing the magnetic core 300 is not limited to the aforementioned method and that the magnetic core 300 may be formed by any manufacturing method. The magnetic core 300 partially forms a magnetic path of the coil 200. The magnetic core 300 is positioned at a region excluding a specific region SR which is positioned just below the coil 200. In other words, the magnetic core 300 has no portion which is positioned just below the coil 200. It is noted that the specific region SR is a region which is hidden below the coil 200 when the coil 200 is viewed alone from above. The specific region SR is positioned below the lower end 220 of the coil 200 in the up-down direction. The specific region SR is positioned outside the inner periphery 240 of the coil 200 in a radial direction perpendicular to the winding axis AX. The specific region SR is positioned inside the outer periphery 230 of the coil 200 in the radial direction perpendicular to the winding axis AX. The magnetic core 300 at least has a center core 310.

Referring to FIG. 3, the center core 310 of the present embodiment has a cylindrical shape extending in the up-down direction. The center core 310 is at least partially positioned inside the coil 200. A center axis of the cylindrical shape of the center core 310 is coincide with the winding axis AX of the coil 200. A size of a cross-section, which is perpendicular to the up-down direction, of the center core 310 is smaller than the diameter of the opening 512. A projected image of the center core 310, which is projected onto the circuit board 500 in the up-down direction, is positioned within the opening 512.

As described above, the coil antenna 100 is mounted on the circuit board 500 so that the coil antenna 100 at least overlaps with the opening 512 when the coil antenna 100 is viewed along the up-down direction perpendicular to the circuit board 500, the magnetic core 300 is positioned at the region excluding the specific region SR which is positioned just below the coil 200, the magnetic core 300 at least has the center core 310 and the center core 310 is at least partially positioned inside the coil 200. Thus, in the antenna device 10 of the present embodiment, a part of a flux of the coil 200 flows to the opening 512 of the circuit board 500 and thereby the coil antenna 100 can easily be electromagnetically coupled with the current (current loop) which goes around the opening 512 and the slit 514 of the conductive portion 510. In other words, this strengthens coupling of the current-loop, which flows at an outer periphery of the slit 514 of the circuit board 500, with the coil antenna 100 in the antenna device 10 of the present embodiment, and thereby the antenna device 10 of the present embodiment has further enhanced antenna characteristics.

As shown in FIG. 3, the center core 310 extends downward in the up-down direction beyond the lower end 220 of the coil 200. Thus, in the antenna device 10 of the present embodiment, the part of the flux of the coil 200 further flows to the opening 512 of the circuit board 500 and thereby the coil antenna 100 can more easily be electromagnetically coupled with the current (current loop) which goes around the opening 512 and the slit 514 of the conductive portion 510. In other words, this further strengthens the coupling of the current-loop, which flows at the outer periphery of the slit 514 (see FIG. 12) of the circuit board 500, with the coil antenna 100 in the antenna device 10 of the present embodiment, and thereby the antenna device 10 of the present embodiment has more further enhanced antenna characteristics.

As shown in FIG. 3, the center core 310 extends upward in the up-down direction beyond the upper end 210 of the coil 200.

As shown in FIG. 3, the magnetic core 300 further has an upper portion 320.

As shown in FIG. 3, the upper portion 320 extends from the center core 310 toward the outer periphery 230 of the coil 200. In the radial direction perpendicular to the center axis of the cylindrical shape of the center core 310, an outer end of the upper portion 320 is positioned outside the outer periphery 230 of the coil 200. The upper portion 320 overlaps with the coil 200 when the upper portion 320 is viewed in the up-down direction. This enables the flux of the coil 200, which flows through the center core 310 to an upper part of the magnetic core 300, to efficiently flow toward the outer periphery 230 of the coil 200.

Figure 7:
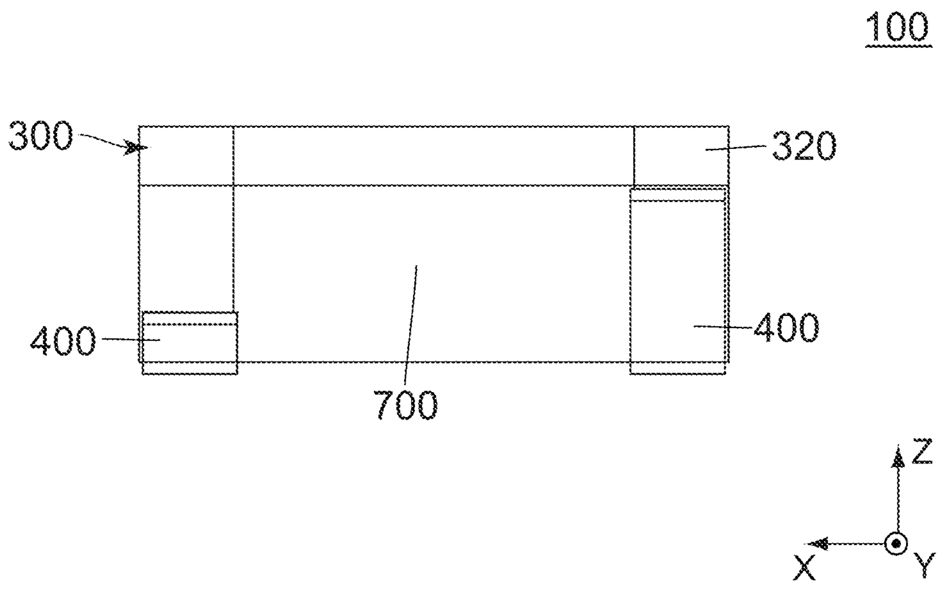
FIG. 7 is a front view showing the coil antenna of FIG. 4.

As shown in FIG. 7, the coil antenna 100 further has two terminals 400.

Figure 8:
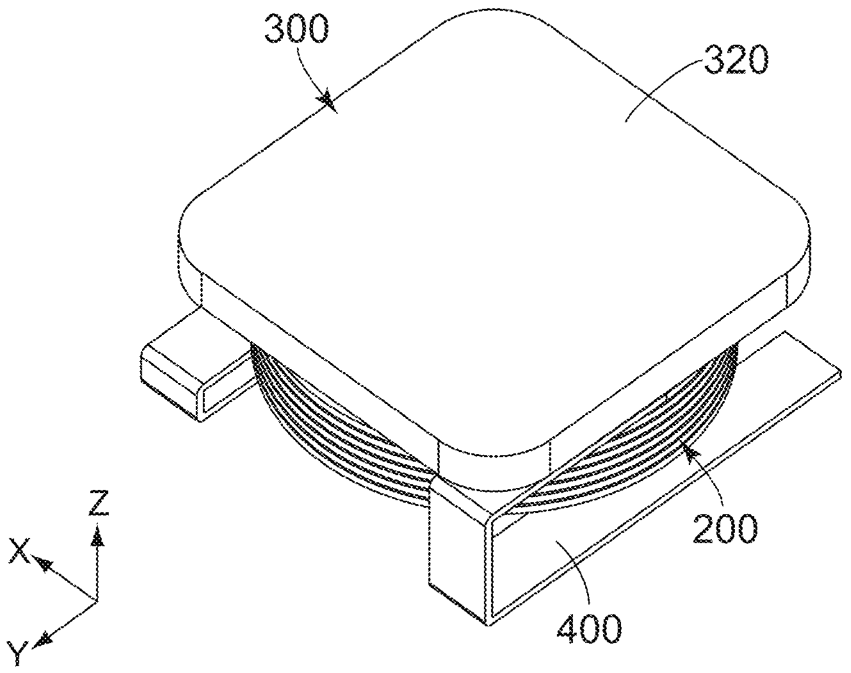
FIG. 8 is a perspective view showing a state where the molded resinous member is removed from the coil antenna of FIG. 4.

Referring to FIG. 8, the terminals 400 of the present embodiment are attached to end portions, respectively, of the coil 200. However, the present invention is not limited thereto, but the terminal 400 may be a portion formed by elongating the end portion of the coil 200. Each of the terminals 400 defines a lower end of the coil antenna 100. The terminals 400 are connected to a communication circuit (not shown) via pads of the circuit board 500.

Figure 4:
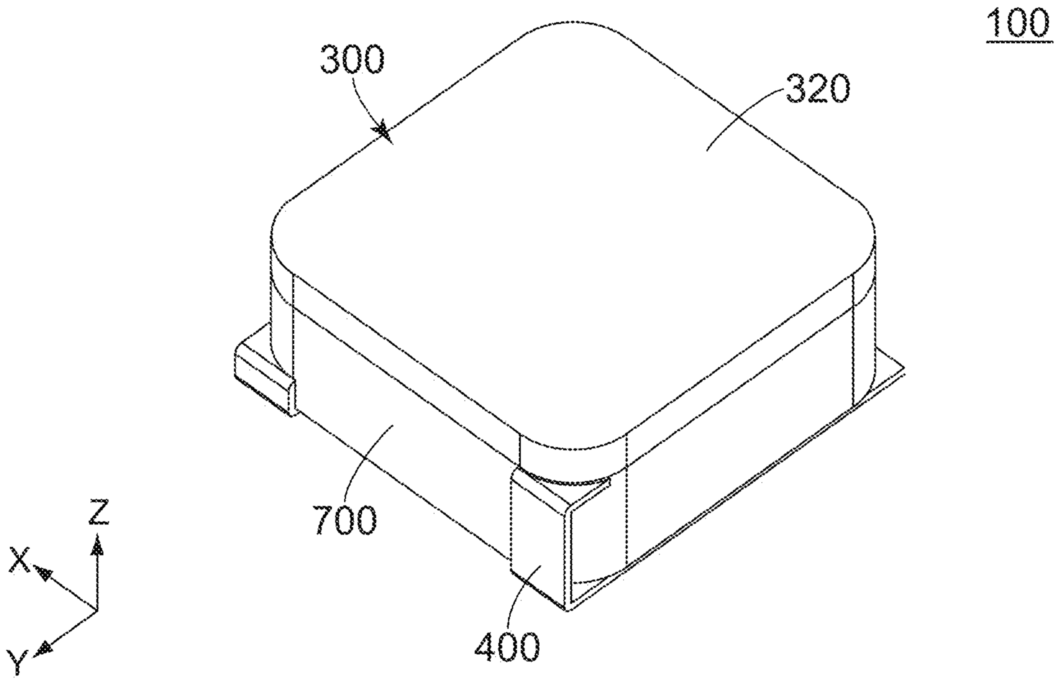
FIG. 4 is a perspective view showing a coil antenna which is included in the antenna device of FIG. 1.

As shown in FIG. 4, the coil antenna 100 comprises a molded resinous member 700.

Figure 5:
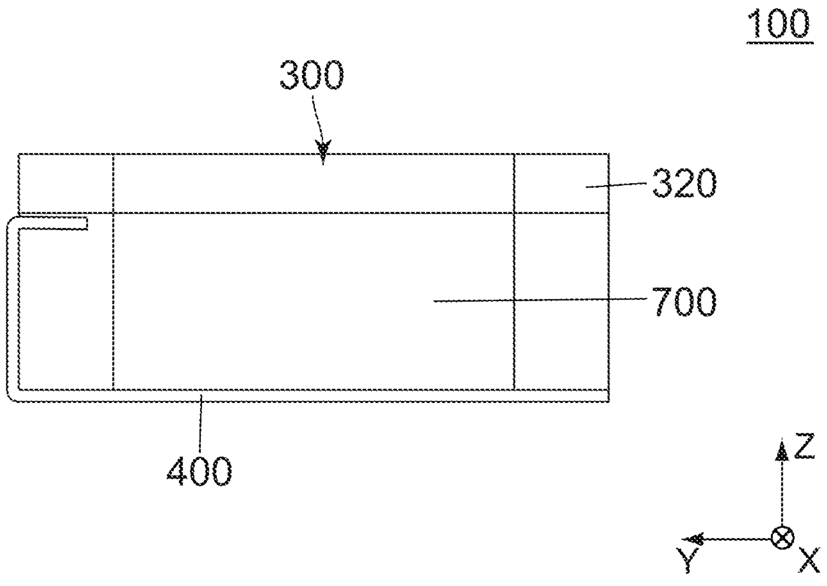
FIG. 5 is a side view showing the coil antenna of FIG. 4.
Figure 6:
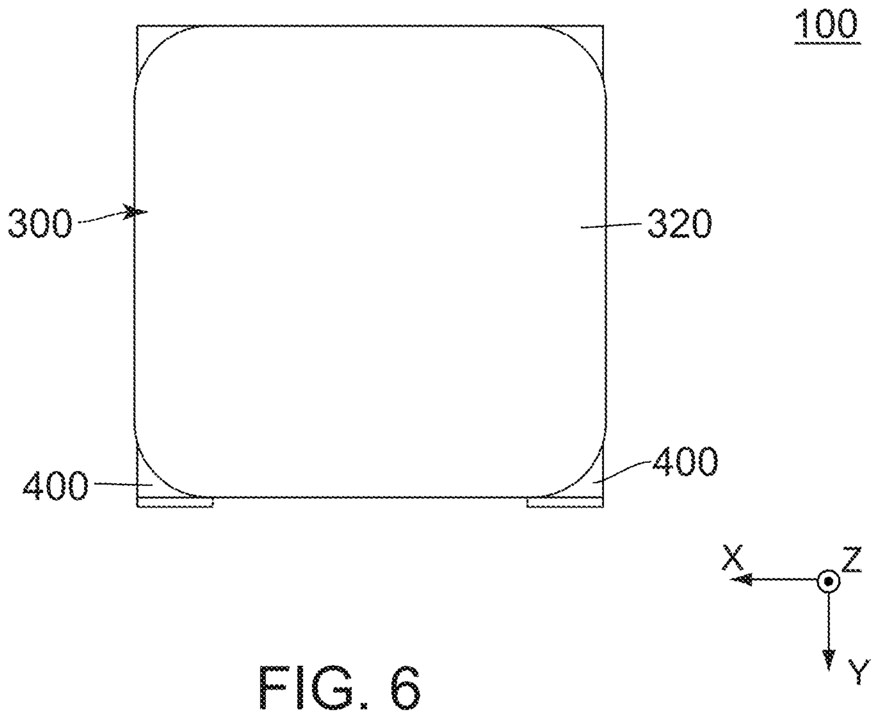
FIG. 6 is a top view showing the coil antenna of FIG. 4.
Figure 9:
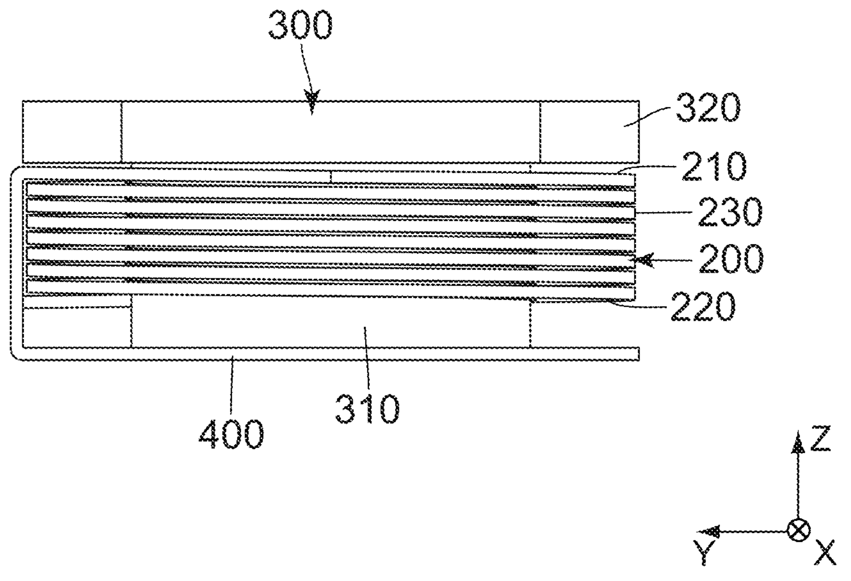
FIG. 9 is a side view showing the coil antenna of FIG. 8.

Referring to FIGS. 5 and 9, the molded resinous member 700 covers the coil 200. Referring to FIGS. 3, 5 and 7, the specific region SR is occupied by the molded resinous member 700. In other words, the molded resinous member 700 is positioned just below the coil 200.

As shown in FIG. 2, the antenna device 10 further has a capacitor 600 which forms a part of the resonant circuit.

Referring to FIG. 12, the capacitor 600 forms a current loop path together with the first path which goes around the opening 512 and the slit 514 of the conductive portion 510. In other words, the capacitor 600 forms the resonant circuit together with the first path which goes around the opening 512 and the slit 514 of the conductive portion 510. A resonant frequency of the resonant circuit is a communication frequency band of the antenna device 10. The capacitor 600 is mounted on the circuit board 500 at its region between the edge 520 and the slit 514. In more detail, the capacitor 600 is mounted on the circuit board 500 at its region between the edge 520 and the second portion 5144. However, the mounting location of the capacitor 600 is not limited to that described above, but the capacitor 600 may be mounted at any location on the conductive portion 510, provided that the capacitor 600 and the first path, which goes around the opening 512 and the slit 514 of the conductive portion 510, form the current loop path.

The configuration of the coil antenna 100 is not limited thereto, but the coil antenna 100 can be modified, for example, as described below.

First Modification

Figure 13:
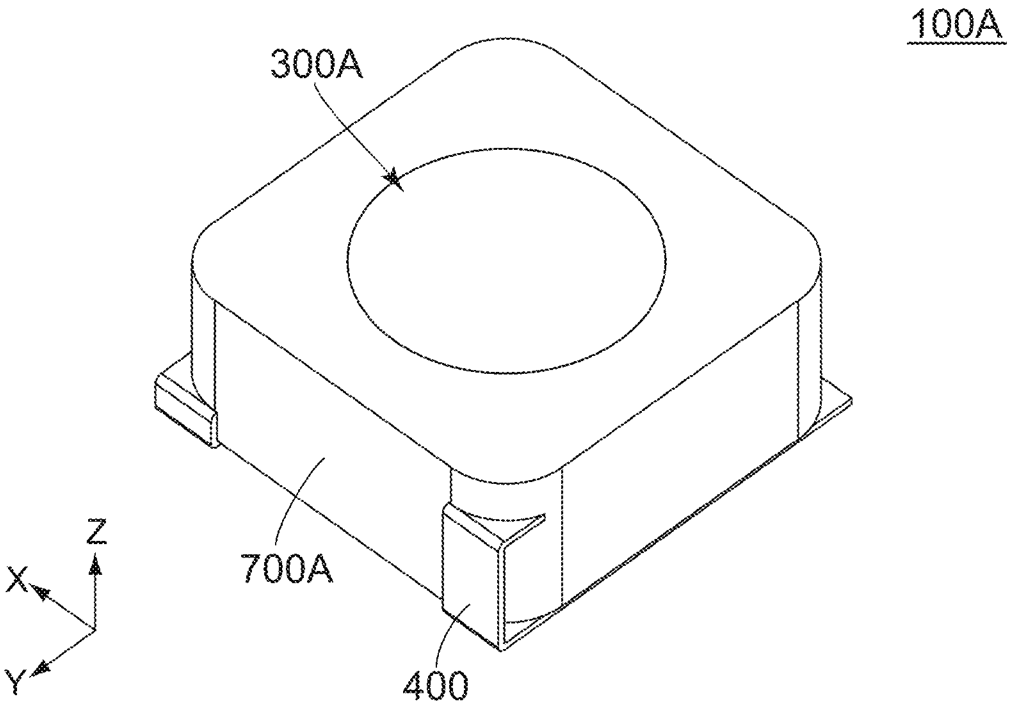
FIG. 13 is a perspective view showing a first modification of the coil antenna of FIG. 4.
Figure 20:
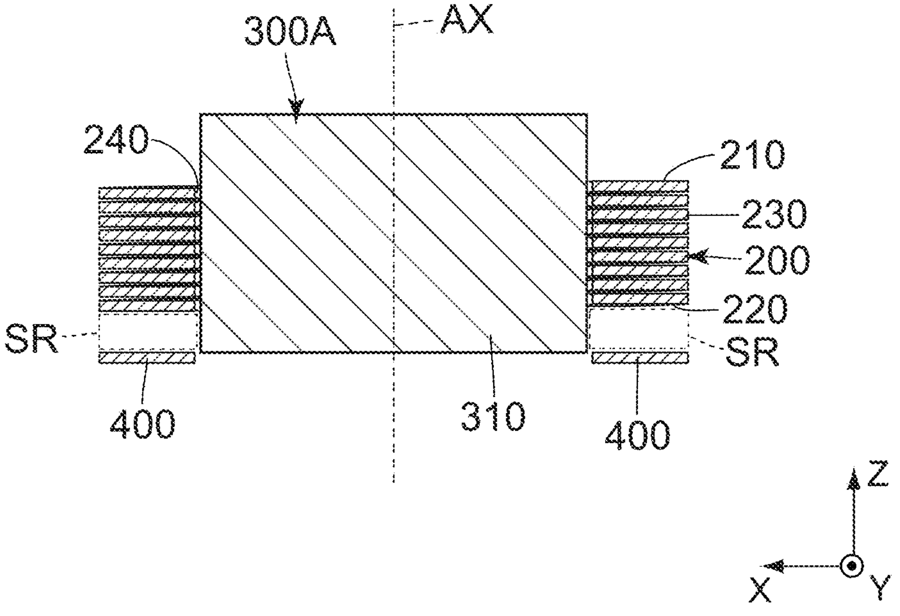
FIG. 20 is a cross-sectional view showing the coil antenna of FIG. 19, taken along line B-B.
Figure 21:
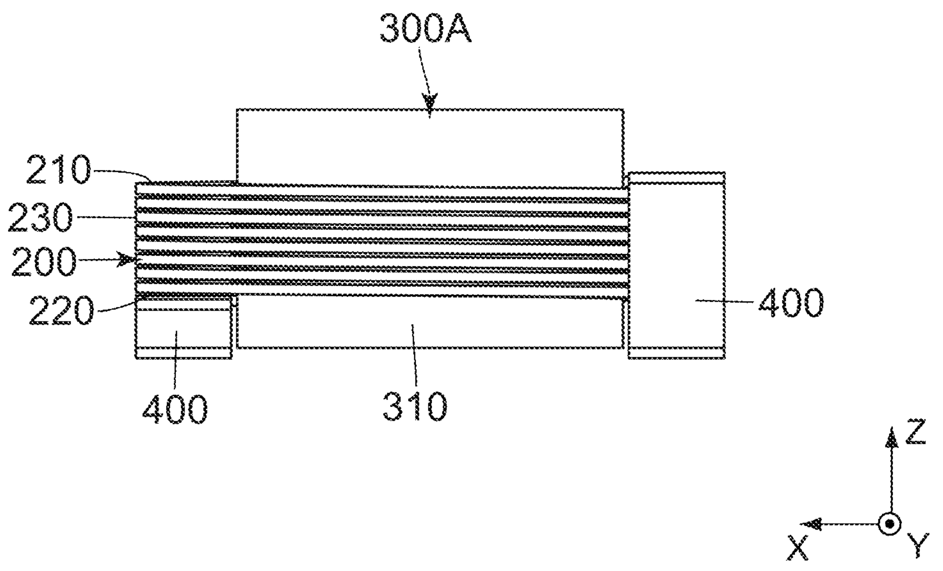
FIG. 21 is a front view showing the coil antenna of FIG. 17.

Referring to FIGS. 13 and 20, a coil antenna 100A according to a first modification of the present invention comprises a coil 200 and a magnetic core 300A. The coil 200 of the present modification has a structure same as that of the coil 200 of the aforementioned embodiment, and detail explanation thereabout will be omitted.

Referring to FIG. 20, the magnetic core 300A of the present embodiment is a cast core similar to the aforementioned magnetic core 300. The magnetic core 300A partially forms a magnetic path of the coil 200. The magnetic core 300A is positioned at a region excluding a specific region SR which is positioned just below the coil 200. It is noted that the specific region SR is a region which is hidden below the coil 200 when the coil 200 is viewed from above. The specific region SR is positioned below a lower end 220 of the coil 200 in the up-down direction. The specific region SR is positioned outside an inner periphery 240 of the coil 200 in a radial direction perpendicular to a winding axis AX. The specific region SR is positioned inside an outer periphery 230 of the coil 200 in the radial direction perpendicular to the winding axis AX. The magnetic core 300A has a center core 310.

Figure 17:
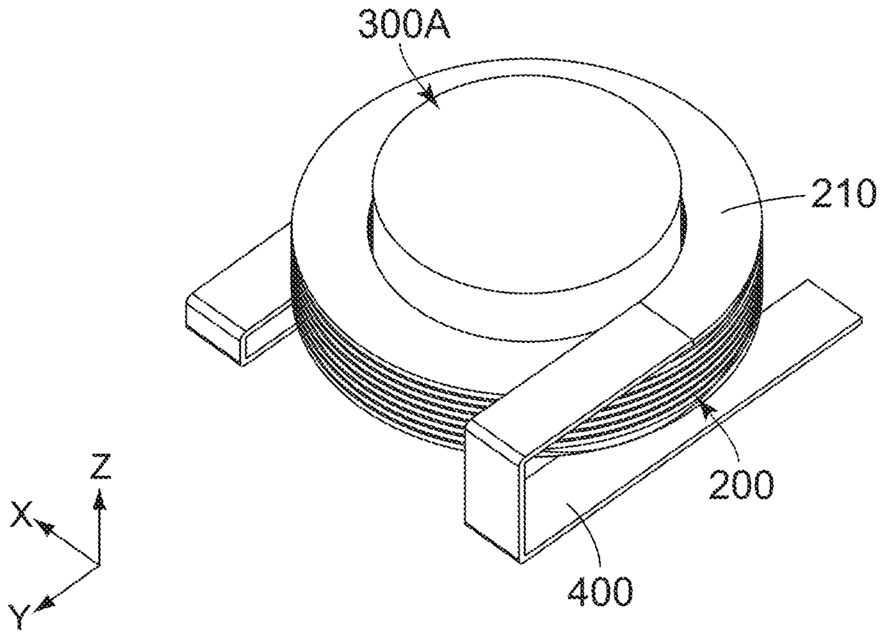
FIG. 17 is a perspective view showing a state where a molded resinous member is removed from the coil antenna of FIG. 13.

Referring to FIGS. 17 and 20, the center core 310 of the present embodiment has a cylindrical shape extending in the up-down direction. The center core 310 is at least partially positioned inside the coil 200.

As shown in FIG. 20, the center core 310 extends downward in the up-down direction beyond a lower end 220 of the coil 200. The center core 310 extends upward in the up-down direction beyond an upper end 210 of the coil 200.

Figure 10:
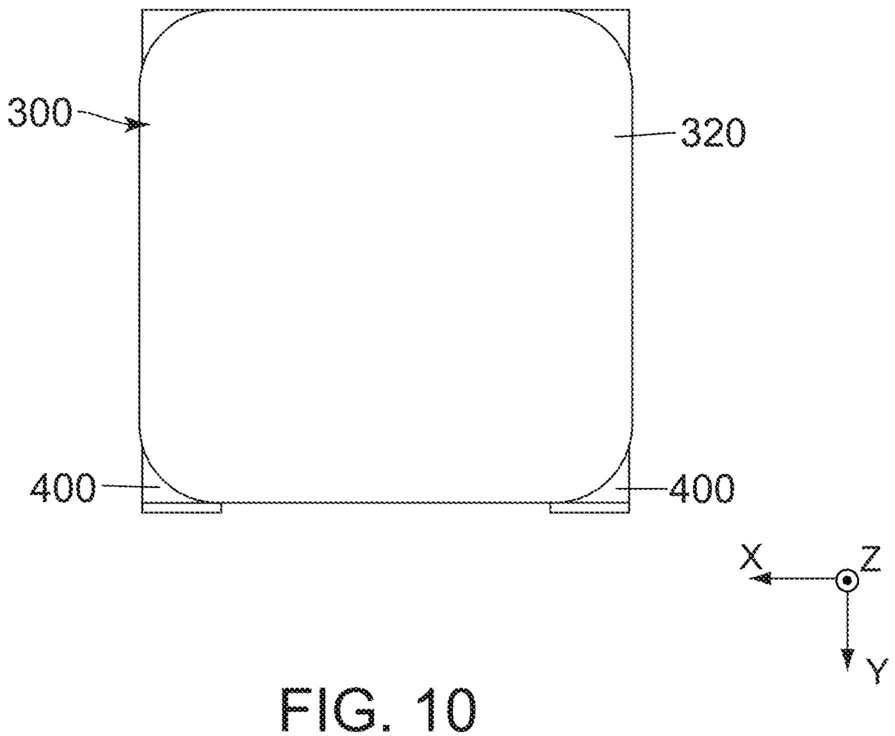
FIG. 10 is a top view showing the coil antenna of FIG. 8.
Figure 11:
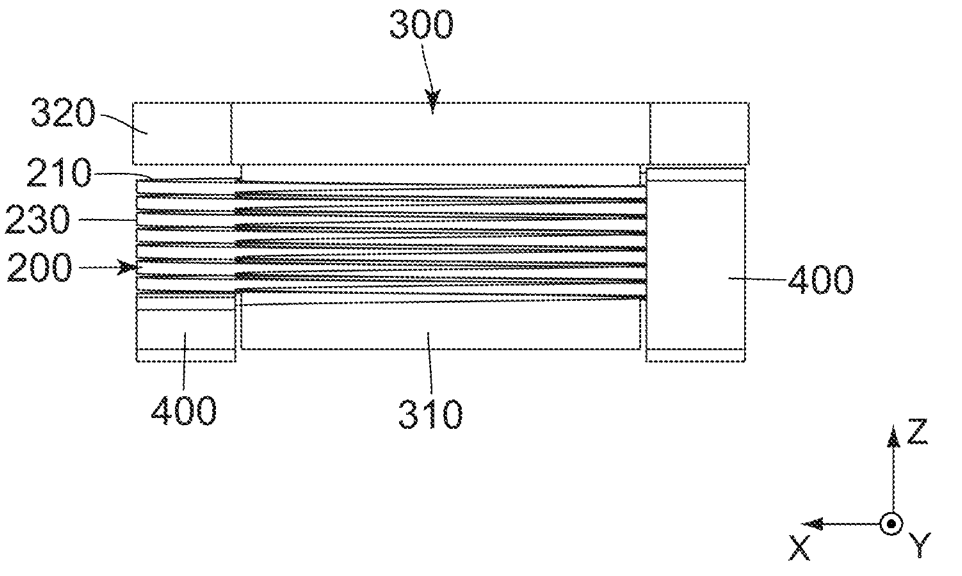
FIG. 11 is a front view showing the coil antenna of FIG. 8.

Referring to FIGS. 10 and 20, dissimilar to magnetic core 300, the magnetic core 300A has no upper portion 320.

As shown in FIG. 13, the coil antenna 100A comprises a molded resinous member 700A.

Figure 14:
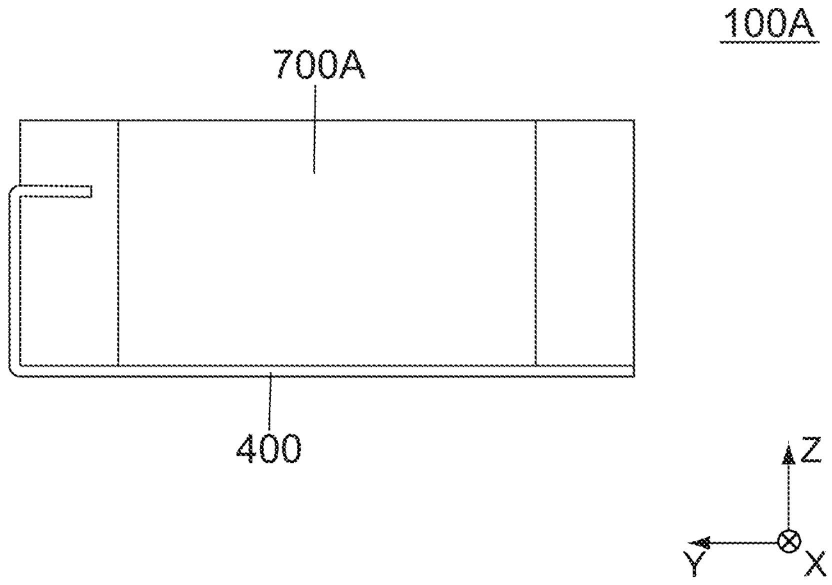
FIG. 14 is a side view showing the coil antenna of FIG. 13.
Figure 15:
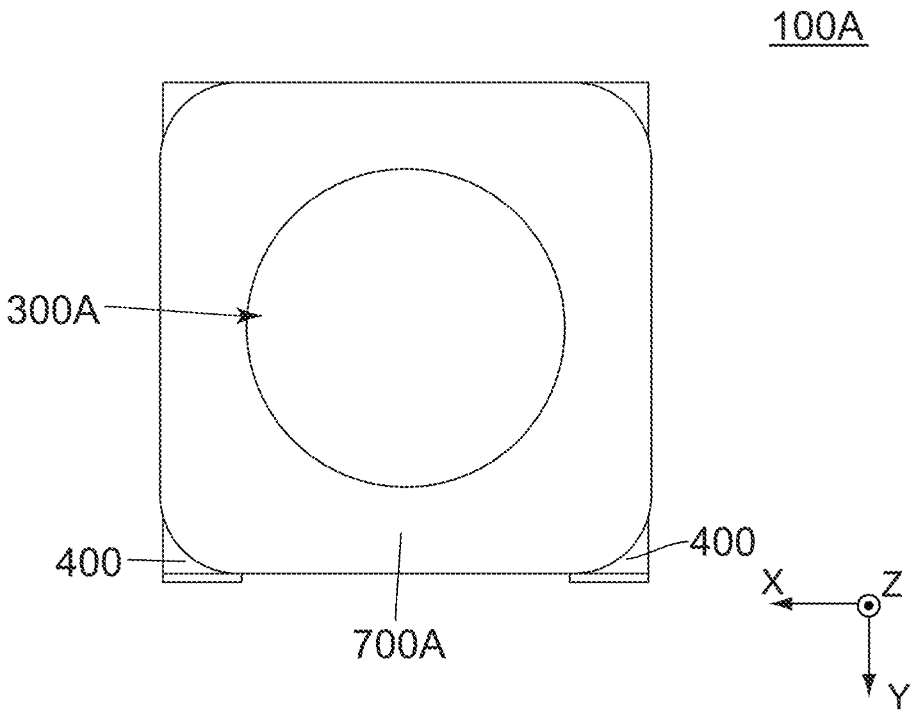
FIG. 15 is a top view showing the coil antenna of FIG. 13.
Figure 16:
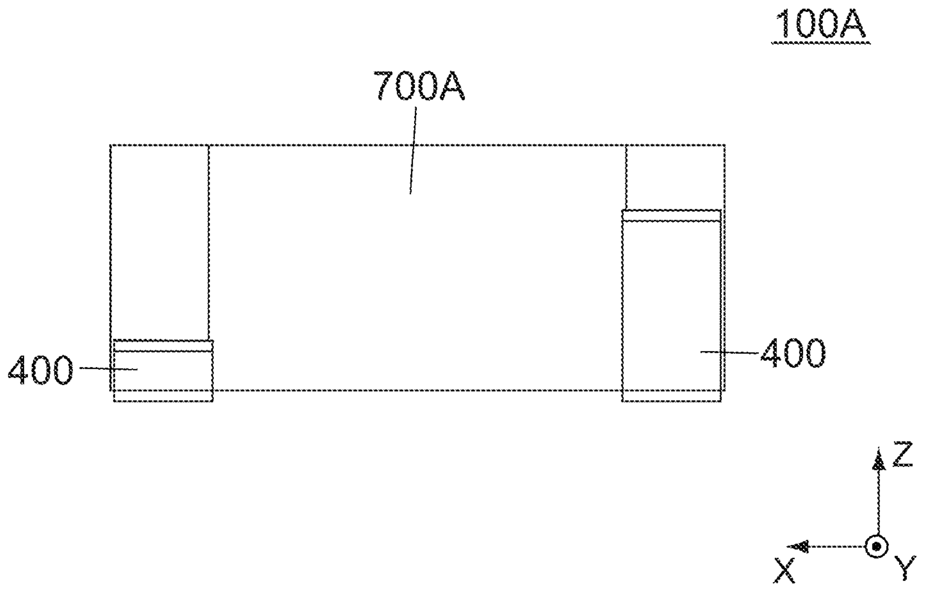
FIG. 16 is a front view showing the coil antenna of FIG. 13.
Figure 18:
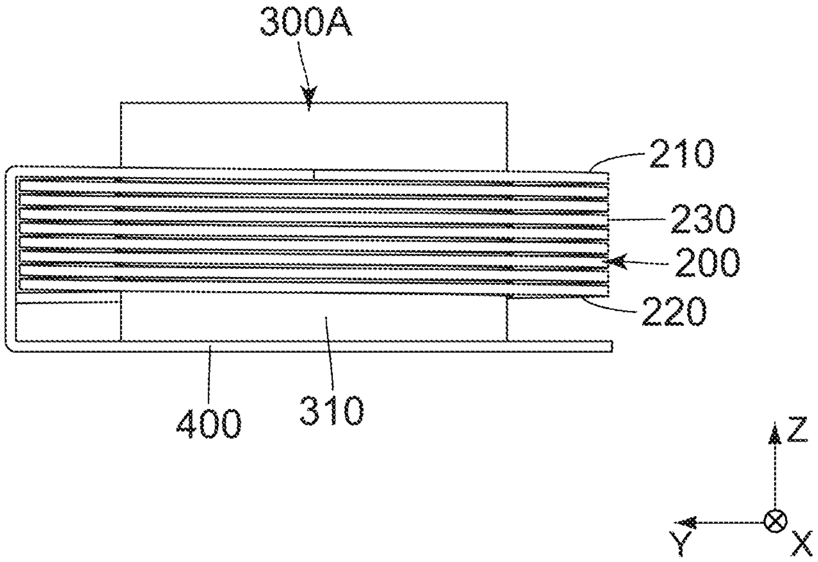
FIG. 18 is a side view showing the coil antenna of FIG. 17.
Figure 19:
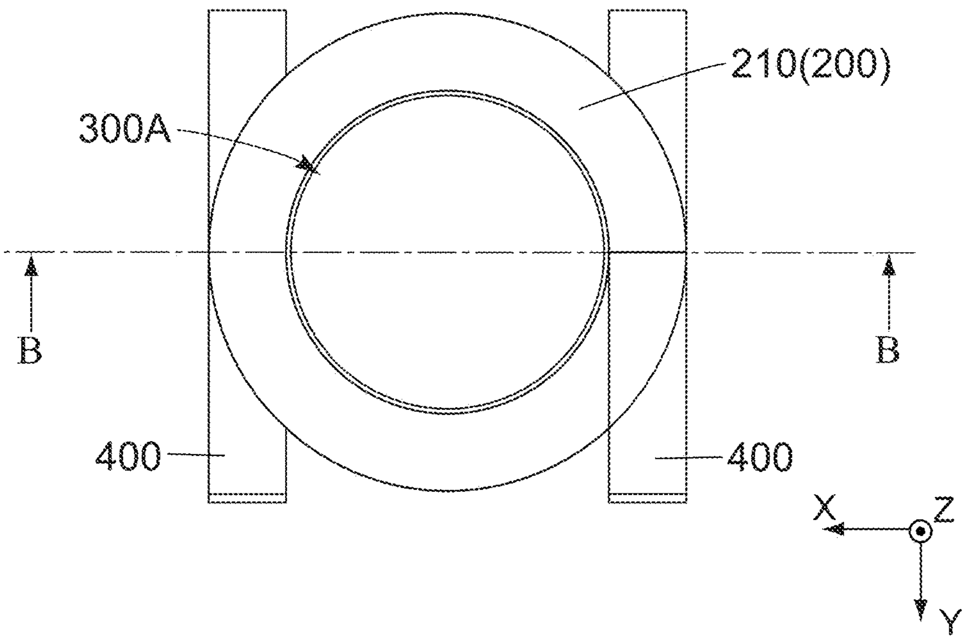
FIG. 19 is a top view showing the coil antenna of FIG. 17.

Referring to FIGS. 14 and 18, the molded resinous member 700A covers the coil 200. Referring to FIG. 20, the specific region SR is occupied by the molded resinous member 700A. In other words, the molded resinous member 700A is positioned just below the coil 200. It is noted that an upper end of the center core 310 is not covered with the molded resinous member 700A as referred to FIG. 15.

An antenna device (not shown), which is configured so that the coil antenna 100A of the present modification is mounted on a circuit board 500, can also have the same effects as the aforementioned embodiment.

Second Modification

Figure 22:
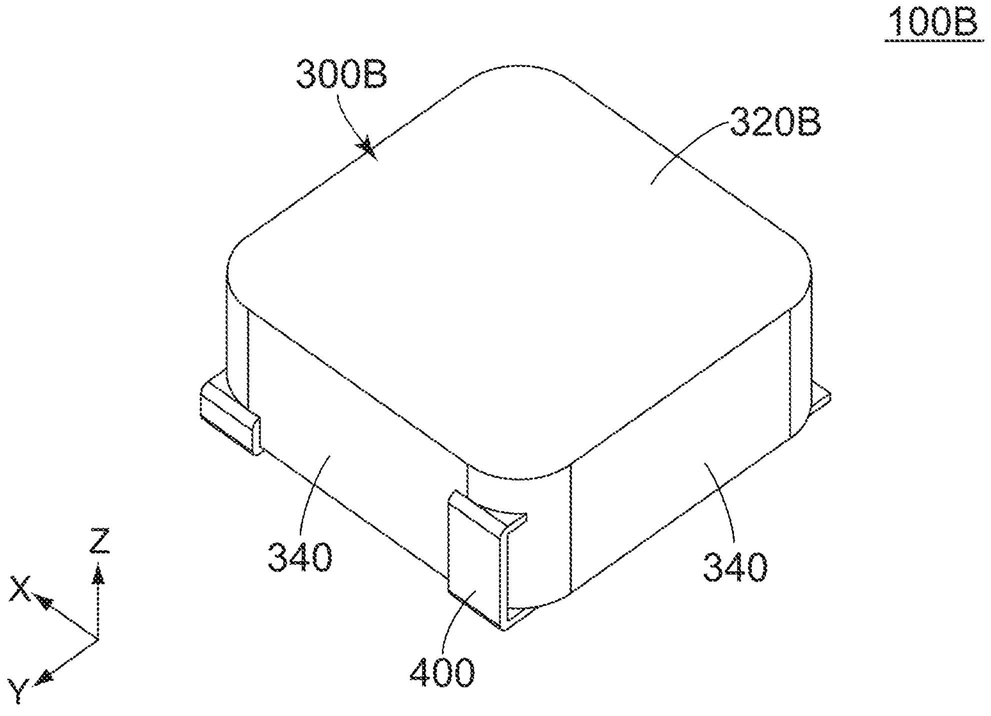
FIG. 22 is a perspective view showing a second modification of the coil antenna of FIG. 4.
Figure 23:
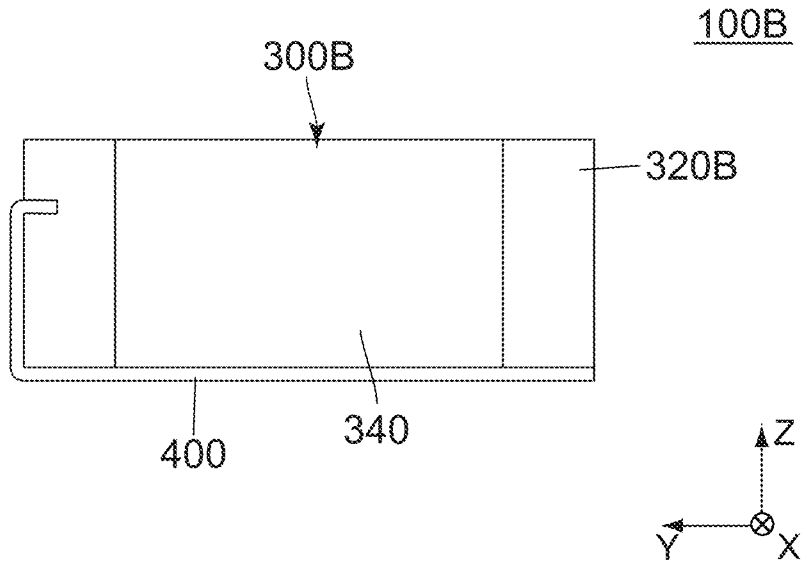
FIG. 23 is a side view showing the coil antenna of FIG. 22.
Figure 24:
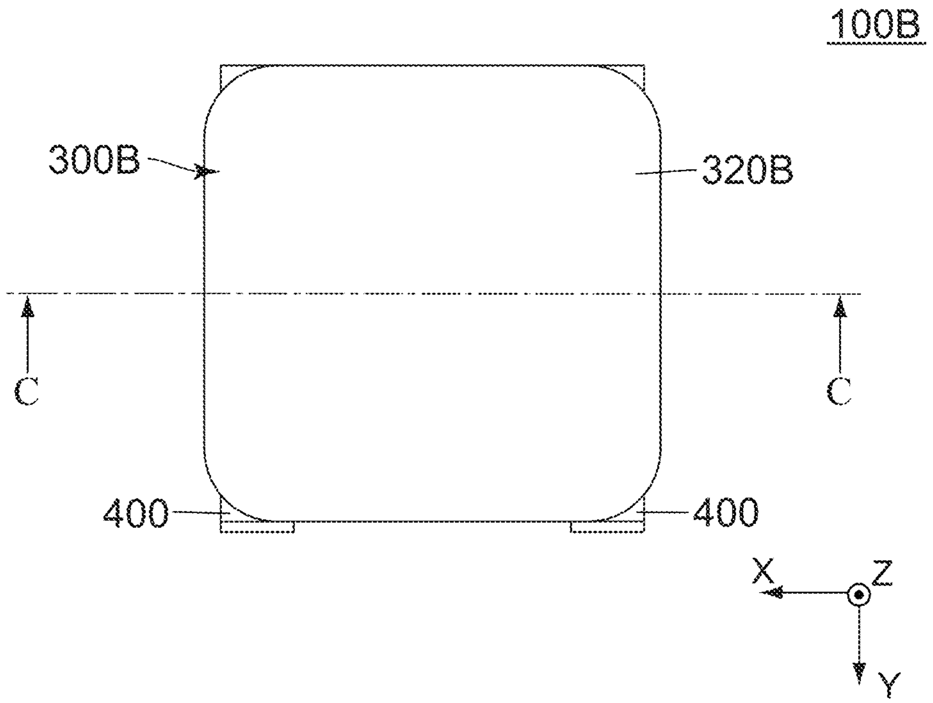
FIG. 24 is a top view showing the coil antenna of FIG. 22.
Figure 25:
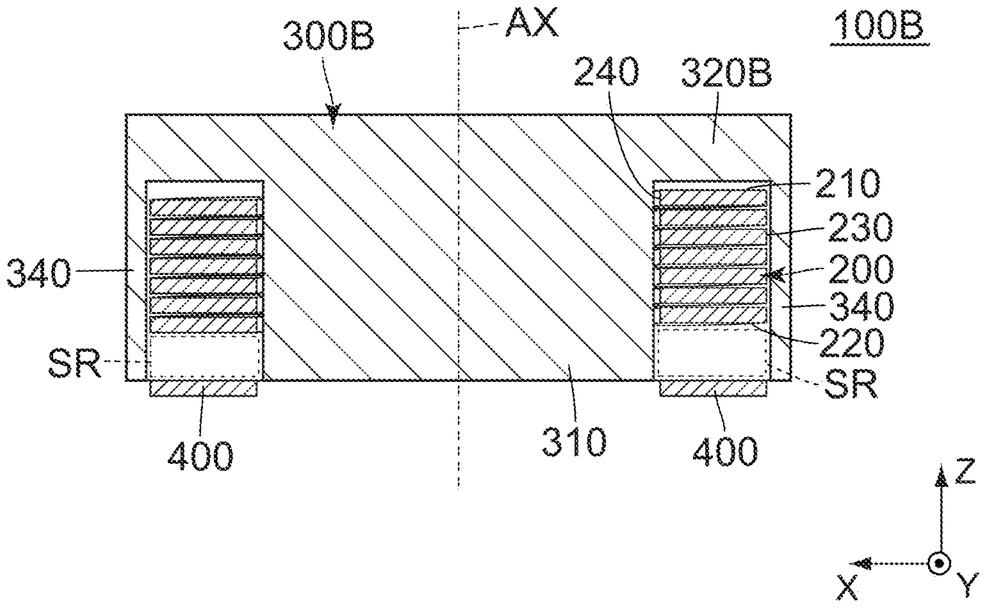
FIG. 25 is a cross-sectional view showing the coil antenna of FIG. 24, taken along line C-C. In the figure, a molded resinous member is omitted.
Figure 26:
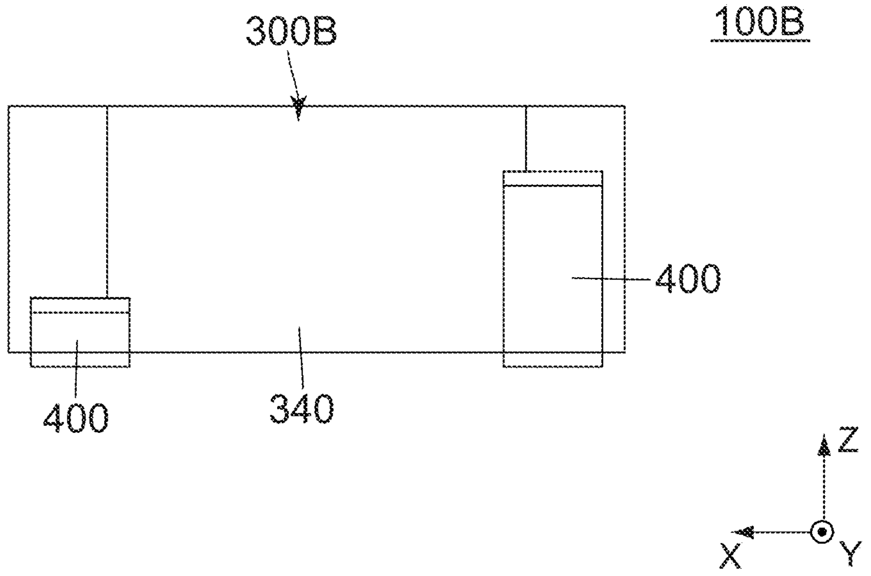
FIG. 26 is a front view showing the coil antenna of FIG. 22.

Referring to FIGS. 22 and 25, a coil antenna 100B according to a second modification of the present invention comprises a coil 200 and a magnetic core 300B. The coil 200 of the present modification has a structure same as that of the coil 200 of the aforementioned embodiment, and detail explanation thereabout will be omitted.

Referring to FIG. 25, the magnetic core 300B of the present embodiment is a cast core similar to the aforementioned magnetic core 300. The magnetic core 300B partially forms a magnetic path of the coil 200. The magnetic core 300B is positioned at a region excluding a specific region SR which is positioned just below the coil 200. It is noted that the specific region SR is a region which is hidden below the coil 200 when the coil 200 is viewed from above. The specific region SR is positioned below a lower end 220 of the coil 200 in the up-down direction. The specific region SR is positioned outside an inner periphery 240 of the coil 200 in a radial direction perpendicular to a winding axis AX. The specific region SR is positioned inside an outer periphery 230 of the coil 200 in the radial direction perpendicular to the winding axis AX. The magnetic core 300B at least has a center core 310.

Referring to FIG. 25, the center core 310 of the present embodiment has a cylindrical shape extending in the up-down direction. The center core 310 is at least partially positioned inside the coil 200.

As shown in FIG. 25, the center core 310 extends downward in the up-down direction beyond a lower end 220 of the coil 200. The center core 310 extends upward in the up-down direction beyond an upper end 210 of the coil 200.

As shown in FIG. 25, the magnetic core 300B further has an upper portion 320B. The upper portion 320B of the present modification has a structure same as that of the upper portion 320 of the aforementioned embodiment, and detail explanation thereabout will be omitted.

As shown in FIG. 25, the magnetic core 300B further has a side portion 340.

As shown in FIG. 25, the side portion 340 of the present embodiment is positioned outside the coil 200 in a plane perpendicular to the up-down direction. The side portion 340 extends downward in the up-down direction from the upper portion 320B. This enables a flux of the coil 200, which passes through the upper portion 320B, to efficiently flow toward a lower part of the coil 200. The side portion 340 covers the whole of the outer periphery 230 of the coil 200. However, the present invention is not limited thereto, but the side portion 340 may cover only a part of the outer periphery 230 of the coil 200.

Referring to FIG. 25, the coil antenna 100B comprises a molded resinous member (not shown).

Referring to FIG. 25, the molded resinous member of the present modification covers the coil 200. The specific region SR is occupied by the molded resinous member. In other words, the molded resinous member is positioned just below the coil 200.

An antenna device (not shown), which is configured so that the coil antenna 100B of the present modification is mounted on a circuit board 500, can also have the same effects as the aforementioned embodiment.

Second Embodiment

Figure 27:
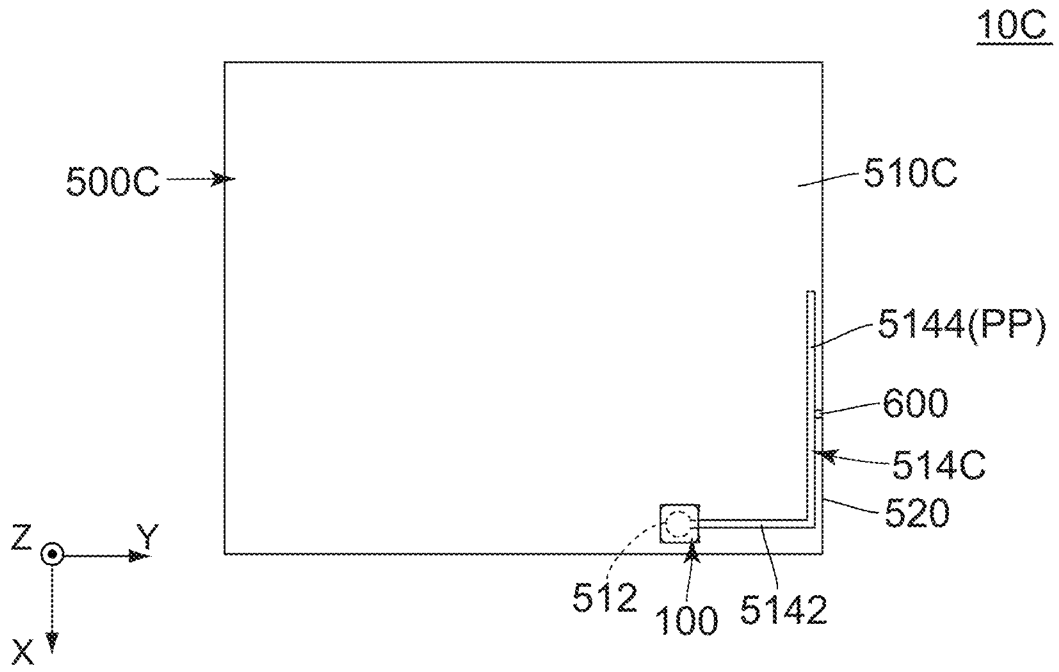
FIG. 27 is a top view showing an antenna device according to a second embodiment of the present invention.

As shown in FIG. 27, an antenna device 10C according to a second embodiment of the present invention comprises a circuit board 500C, a coil antenna 100 and a resonance circuit. The coil antenna 100 of the present embodiment has a structure same as that of the coil antenna 100 of the first embodiment, and detail explanation thereabout will be omitted. As for directions and orientations in the present embodiment, expressions same as those of the first embodiment will be used hereinbelow.

As shown in FIG. 27, the circuit board 500C of the present embodiment has a conductive portion 510C with a flat shape. In more detail, the conductive portion 510C is a ground conductor. Specifically, the circuit board 500C is configured so that a conductive layer, which functions as the conductive portion 510C, is laminated on an insulating substrate such as a glass epoxy substrate.

As shown in FIG. 27, the conductive portion 510C is formed with an opening 512 and a slit 514C. The opening 512 of the present embodiment has a structure same as that of the opening 512 of the first embodiment, and detail explanation thereabout will be omitted. The conductive portion 510C has a first path which goes around the opening 512 and the slit 514C. The first path forms a part of the resonance circuit.

As shown in FIG. 27, similar to the opening 512, the slit 514C of the present embodiment is a part of the circuit board 500C which has no conductive pattern. The slit 514C is coupled with the opening 512. The slit 514C extends from the opening 512. The slit 514C does not communicate with the outside of the conductive portion 510C in a plane perpendicular to the up-down direction. The slit 514C has a predetermined portion PP. The slit 514C has a first portion 5142 and a second portion 5144.

As shown in FIG. 27, a width of the slit 514C is smaller than a diameter of the opening 512. However, the present invention is not limited thereto, but the width of the slit 514C may be equal to the diameter of the opening 512, or the width of the slit 514C may be greater than the diameter of the opening 512. It is noted that an increase of the width of the slit 514C enlarges a current loop, which is formed around the slit 514C, so that a communication range of the antenna device 10C is increased.

As shown in FIG. 27, the first portion 5142 extends rightward in the right-left direction from the opening 512.

As shown in FIG. 27, the second portion 5144 extends from the first portion 5142 in a direction intersecting with the first portion 5142. The second portion 5144 extends rearward in the front-rear direction from a right end of the first portion 5142. The second portion 5144 functions as the predetermined portion PP.

Referring to FIGS. 2 and 27, dissimilar to the slit 514 of the first embodiment, the slit 514C does not comprise a third portion 5146.

As shown in FIG. 27, the circuit board 500C has an edge 520.

As shown in FIG. 27, the edge 520 of the present embodiment defines an outer edge of the circuit board 500C. Specifically, the edge 520 defines the outer edge of the circuit board 500C in a direction perpendicular to the up-down direction. The first portion 5142 extends from the opening 512 toward the edge 520. The predetermined portion PP extends along the edge 520 in the vicinity of the edge 520. This configuration enables the circuit board 500C to have an increased region where electronic components can be arranged on the circuit board 500C, and the communication range of the antenna device 10C can be increased by enlarging the current loop, which is formed around the slit 514C, because this configuration can increase a length of the slit 514C.

As shown in FIG. 27, the antenna device 10C further has a capacitor 600 which forms a part of the resonant circuit.

Referring to FIG. 27, the capacitor 600 forms a current loop path together with the first path which goes around the opening 512 and the slit 514C of the conductive portion 510C. In other words, the capacitor 600 forms the resonant circuit together with the first path which goes around the opening 512 and the slit 514C of the conductive portion 510C. A resonant frequency of the resonant circuit is a communication frequency band of the antenna device 10C. As shown in FIG. 27, the capacitor 600 is mounted on the circuit board 500C at its region between the edge 520 and the slit 514C. In more detail, the capacitor 600 is mounted on the circuit board 500C at its region between the edge 520 and the second portion 5144. However, the mounting location of the capacitor 600 is not limited to that described above, but the capacitor 600 may be mounted at any location on the conductive portion 510C, provided that the capacitor 600 and the first path, which goes around the opening 512 and the slit 514C of the conductive portion 510C, form the current loop path.

Third Embodiment

Figure 28:
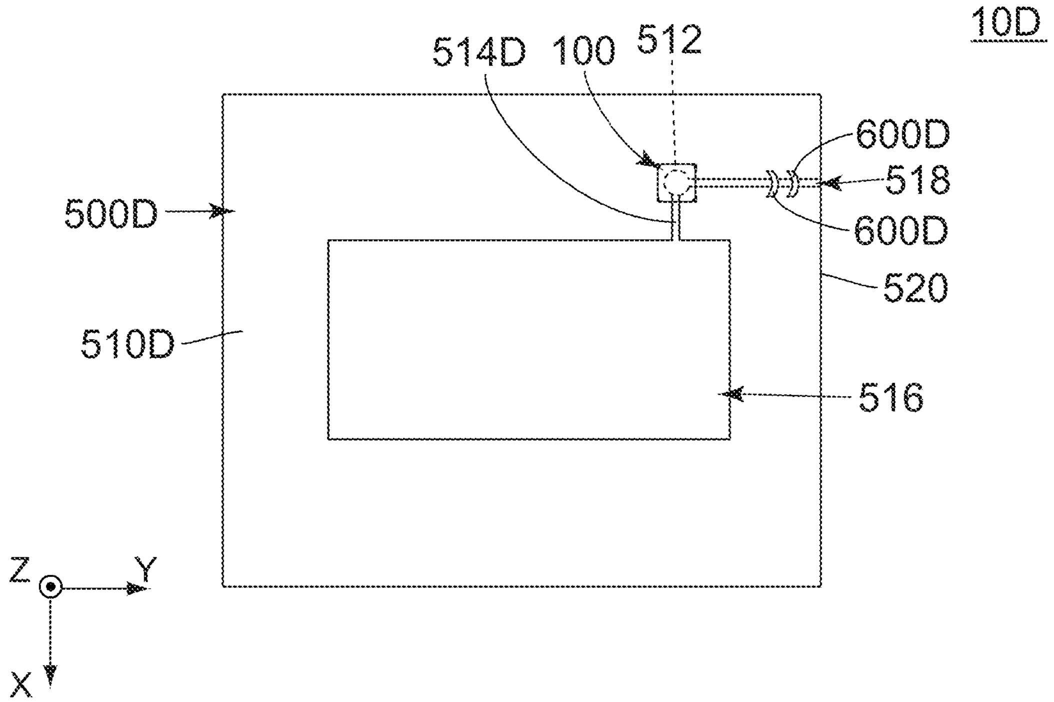
FIG. 28 is a top view showing an antenna device according to a third embodiment of the present invention.

As shown in FIG. 28, an antenna device 10D according to a third embodiment of the present invention comprises a circuit board 500D, a coil antenna 100 and a resonance circuit. The coil antenna 100 of the present embodiment has a structure same as that of the coil antenna 100 of the first embodiment, and detail explanation thereabout will be omitted. As for directions and orientations in the present embodiment, expressions same as those of the first embodiment will be used hereinbelow.

As shown in FIG. 28, the circuit board 500D of the present embodiment has a conductive portion 510D with a flat shape. In more detail, the conductive portion 510D is a ground conductor. Specifically, the circuit board 500D is configured so that a conductive layer, which functions as the conductive portion 510D, is laminated on an insulating substrate such as a glass epoxy substrate.

As shown in FIG. 28, the conductive portion 510D is formed with an opening 512 and a slit 514D. The conductive portion 510D has a first path which goes around the opening 512 and the slit 514D. The first path forms a part of the resonance circuit. The opening 512 of the present embodiment has a structure same as that of the opening 512 of the first embodiment, and detail explanation thereabout will be omitted.

As shown in FIG. 28, similar to the opening 512, the slit 514D of the present embodiment is a part of the circuit board 500D which has no conductive pattern. The slit 514D is coupled with the opening 512. The slit 514D extends from the opening 512. The slit 514D extends from the opening 512 in the front-rear direction. The slit 514D does not communicate with the outside of the conductive portion 510D in a plane perpendicular to the up-down direction.

As shown in FIG. 28, a width of the slit 514D is smaller than a diameter of the opening 512. However, the present invention is not limited thereto, but the width of the slit 514D may be equal to the diameter of the opening 512, or the width of the slit 514D may be greater than the diameter of the opening 512. It is noted that an increase of the width of the slit 514D enlarges a current loop, which is formed around the slit 514D, so that a communication range of the antenna device 10D is increased.

As shown in FIG. 28, the conductive portion 510D is further formed with an additional opening 516.

As shown in FIG. 28, the additional opening 516 of the present embodiment is a hole piercing the circuit board 500D. In other words, the additional opening 516 pierces the circuit board 500D in the up-down direction. However, the present invention is not limited thereto, but the additional opening 516 may be a part of the circuit board 500D, which has no conductive pattern, similar to the opening 512. The additional opening 516 is positioned forward of the opening 512 in the front-rear direction. In the plane perpendicular to the up-down direction, the additional opening 516 is greater than the opening 512. The conductive portion 510D has a second path which goes around the additional opening 516. The second path forms a part of the resonance circuit. The slit 514D is coupled with both of the opening 512 and the additional opening 516.

As shown in FIG. 28, the conductive portion 510D is further formed with an additional slit 518.

As shown in FIG. 28, the additional slit 518 of the present embodiment is a part of the circuit board 500D, which has no conductive pattern, similar to the opening 512. The additional slit 518 is coupled with the opening 512. The additional slit 518 extends from the opening 512. The additional slit 518 extends in the right-left direction. The additional slit 518 communicates with the outside of the conductive portion 510D in the plane perpendicular to the up-down direction. All of the opening 512, the slit 514D, the additional opening 516 and the additional slit 518 are coupled to one another.

As shown in FIG. 28, a width of the additional slit 518 is smaller than the diameter of the opening 512. However, the present invention is not limited thereto, but the width of the additional slit 518 may be equal to the diameter of the opening 512, or the width of the additional slit 518 may be greater than the diameter of the opening 512.

As shown in FIG. 28, the circuit board 500D has an edge 520.

As shown in FIG. 28, the edge 520 defines an outer edge of the circuit board 500. Specifically, the edge 520 defines the outer edge of the circuit board 500D in a direction perpendicular to the up-down direction. The slit 514D does not reach the edge 520. The additional slit 518 extends toward the edge 520. Specifically, the additional slit 518 extends from the opening 512 toward the edge 520. The additional slit 518 reaches the edge 520.

Referring to FIG. 28, the coil antenna 100 is mounted on the circuit board 500D so that the coil antenna 100 at least overlaps with the opening 512 when the coil antenna 100 is viewed along the up-down direction perpendicular to the circuit board 500D. The coil antenna 100 is mounted on the circuit board 500D so that the coil antenna 100 does not overlap with the additional opening 516 when the coil antenna 100 is viewed along the up-down direction. The coil antenna 100 is surface-mounted on the circuit board 500D.

As shown in FIG. 28, the antenna device 10D further has capacitors 600D which form a part of the resonant circuit.

Referring to FIG. 28, the capacitors 600D form a current loop path together with a path which goes around the opening 512, the additional opening 516, the slit 514D and the additional slit 518 of the conductive portion 510D. In other words, the capacitors 600D form the resonant circuit together with the path which goes around the opening 512, the additional opening 516, the slit 514D and the additional slit 518 of the conductive portion 510D. A resonant frequency of the resonant circuit is a communication frequency band of the antenna device 10D. The capacitors 600D are mounted on the circuit board 500D so that each of the capacitors 600D is wired across the additional slit 518. However, the mounting locations of the capacitors 600D are not limited to those described above, but the capacitors 600D may be mounted at any locations on the conductive portion 510D, provided that the capacitors 600D and the path, which goes around the opening 512, the additional opening 516, the slit 514D and the additional slit 518 of the conductive portion 510D, form the current loop path.

Fourth Embodiment

Figure 29:
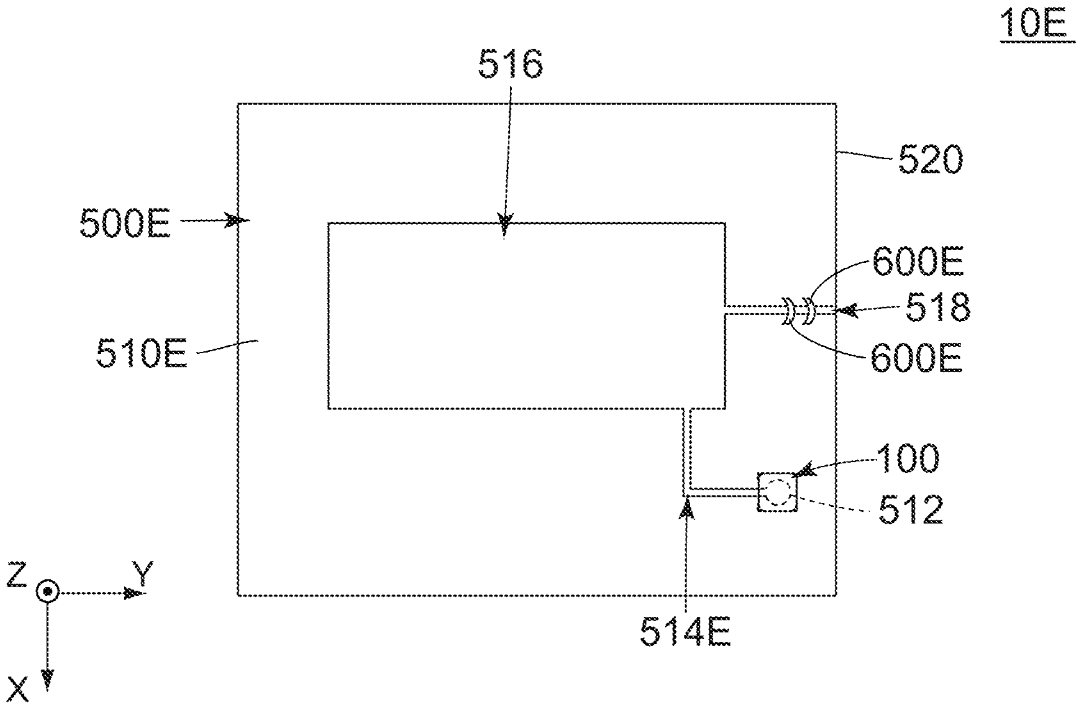
FIG. 29 is a top view showing an antenna device according to a fourth embodiment of the present invention.

As shown in FIG. 29, an antenna device 10E according to a fourth embodiment of the present invention comprises a circuit board 500E, a coil antenna 100 and a resonance circuit. The coil antenna 100 of the present embodiment has a structure same as that of the coil antenna 100 of the first embodiment, and detail explanation thereabout will be omitted. As for directions and orientations in the present embodiment, expressions same as those of the first embodiment will be used hereinbelow.

As shown in FIG. 29, the circuit board 500E of the present embodiment has a conductive portion 510E with a flat shape. In more detail, the conductive portion 510E is a ground conductor. Specifically, the circuit board 500E is configured so that a conductive layer, which functions as the conductive portion 510E, is laminated on an insulating substrate such as a glass epoxy substrate.

As shown in FIG. 29, the conductive portion 510E is formed with an opening 512 and a slit 514E. The conductive portion 510E has a first path which goes around the opening 512 and the slit 514E. The first path forms a part of the resonance circuit. The opening 512 of the present embodiment has a structure same as that of the opening 512 of the first embodiment, and detail explanation thereabout will be omitted.

As shown in FIG. 29, similar to the opening 512, the slit 514E of the present embodiment is a part of the circuit board 500E which has no conductive pattern. The slit 514E is coupled with the opening 512. The slit 514E extends leftward in the right-left direction from the opening 512, and then extends rearward in the front-rear direction. The slit 514E extends from the opening 512. The slit 514E does not communicate with the outside of the conductive portion 510E in a plane perpendicular to the up-down direction.

As shown in FIG. 29, a width of the slit 514E is smaller than a diameter of the opening 512. However, the present invention is not limited thereto, but the width of the slit 514E may be equal to the diameter of the opening 512, or the width of the slit 514E may be greater than the diameter of the opening 512. It is noted that an increase of the width of the slit 514E enlarges a current loop, which is formed around the slit 514E, so that a communication range of the antenna device 10E is increased.

As shown in FIG. 29, the conductive portion 510E is further formed with an additional opening 516.

As shown in FIG. 29, the additional opening 516 of the present embodiment is a hole piercing the circuit board 500E. In other words, the additional opening 516 pierces the circuit board 500E in the up-down direction. However, the present invention is not limited thereto, but the additional opening 516 may be a part of the circuit board 500E, which has no conductive pattern, similar to the opening 512. The additional opening 516 is positioned rearward of the opening 512 in the front-rear direction. In the plane perpendicular to the up-down direction, the additional opening 516 is greater than the opening 512. The conductive portion 510E has a second path which goes around the additional opening 516. The second path forms a part of the resonance circuit. The slit 514E is coupled with both of the opening 512 and the additional opening 516.

As shown in FIG. 29, the conductive portion 510E is further formed with an additional slit 518.

As shown in FIG. 29, the additional slit 518 of the present embodiment is a part of the circuit board 500E, which has no conductive pattern, similar to the opening 512. The additional slit 518 is coupled with the additional opening 516. The additional slit 518 extends from the additional opening 516. The additional slit 518 extends in the right-left direction. The additional slit 518 communicates with the outside of the conductive portion 510E in the plane perpendicular to the up-down direction. All of the opening 512, the slit 514E, the additional opening 516 and the additional slit 518 are coupled to one another.

As shown in FIG. 29, the circuit board 500E has an edge 520.

As shown in FIG. 29, the edge 520 defines an outer edge of the circuit board 500E. Specifically, the edge 520 defines the outer edge of the circuit board 500E in a direction perpendicular to the up-down direction. The slit 514E does not reach the edge 520. The additional slit 518 extends toward the edge 520. Specifically, the additional slit 518 extends from the additional opening 516 toward the edge 520. The additional slit 518 reaches the edge 520.

Referring to FIG. 29, the coil antenna 100 is mounted on the circuit board 500E so that the coil antenna 100 at least overlaps with the opening 512 when the coil antenna 100 is viewed along the up-down direction perpendicular to the circuit board 500E. The coil antenna 100 is mounted on the circuit board 500E so that the coil antenna 100 does not overlap with the additional opening 516 when the coil antenna 100 is viewed along the up-down direction. The coil antenna 100 is surface-mounted on the circuit board 500E.

As shown in FIG. 29, the antenna device 10E further has capacitors 600E which form a part of the resonant circuit.

Referring to FIG. 29, the capacitors 600E form a current loop path together with a path which goes around the opening 512, the additional opening 516, the slit 514E and the additional slit 518 of the conductive portion 510E. In other words, the capacitors 600E form the resonant circuit together with the path which goes around the opening 512, the additional opening 516, the slit 514E and the additional slit 518 of the conductive portion 510E. A resonant frequency of the resonant circuit is a communication frequency band of the antenna device 10E. The capacitors 600E are mounted on the circuit board 500E so that each of the capacitors 600E is wired across the additional slit 518. However, the mounting locations of the capacitors 600E are not limited to those described above, but the capacitors 600E may be mounted at any locations on the conductive portion 510E, provided that the capacitors 600E and the path, which goes around the opening 512, the additional opening 516, the slit 514E and the additional slit 518 of the conductive portion 510E, form the current loop path.

Fifth Embodiment

Figure 30:
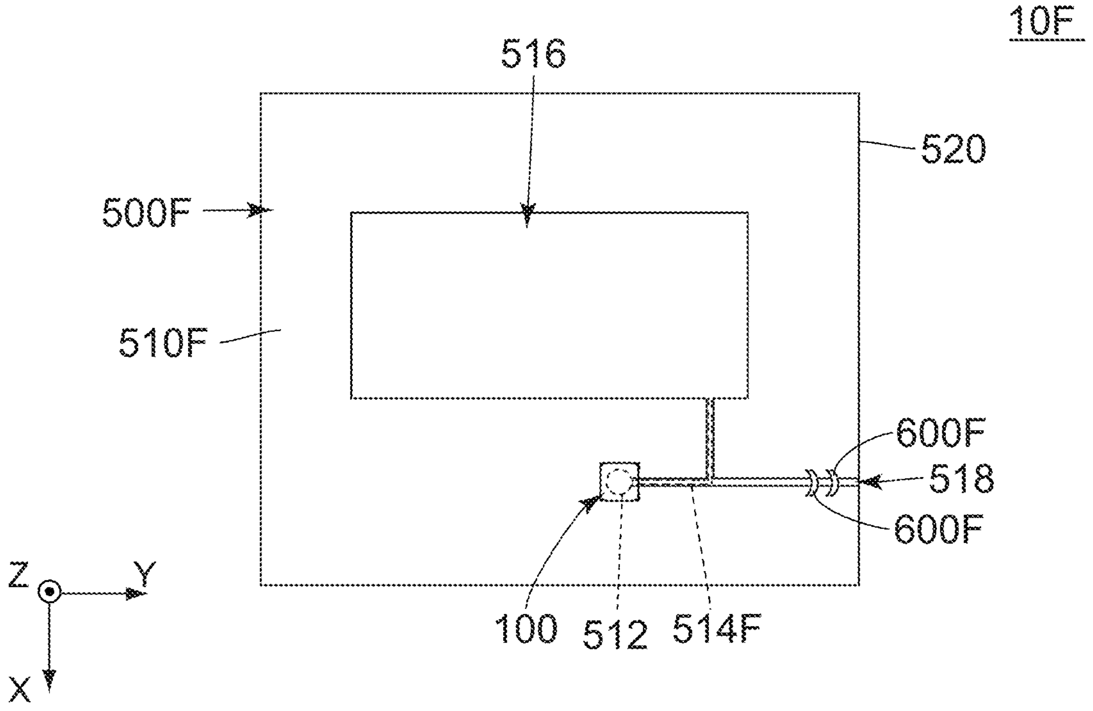
FIG. 30 is a top view showing an antenna device according to a fifth embodiment of the present invention.
Figure 31:
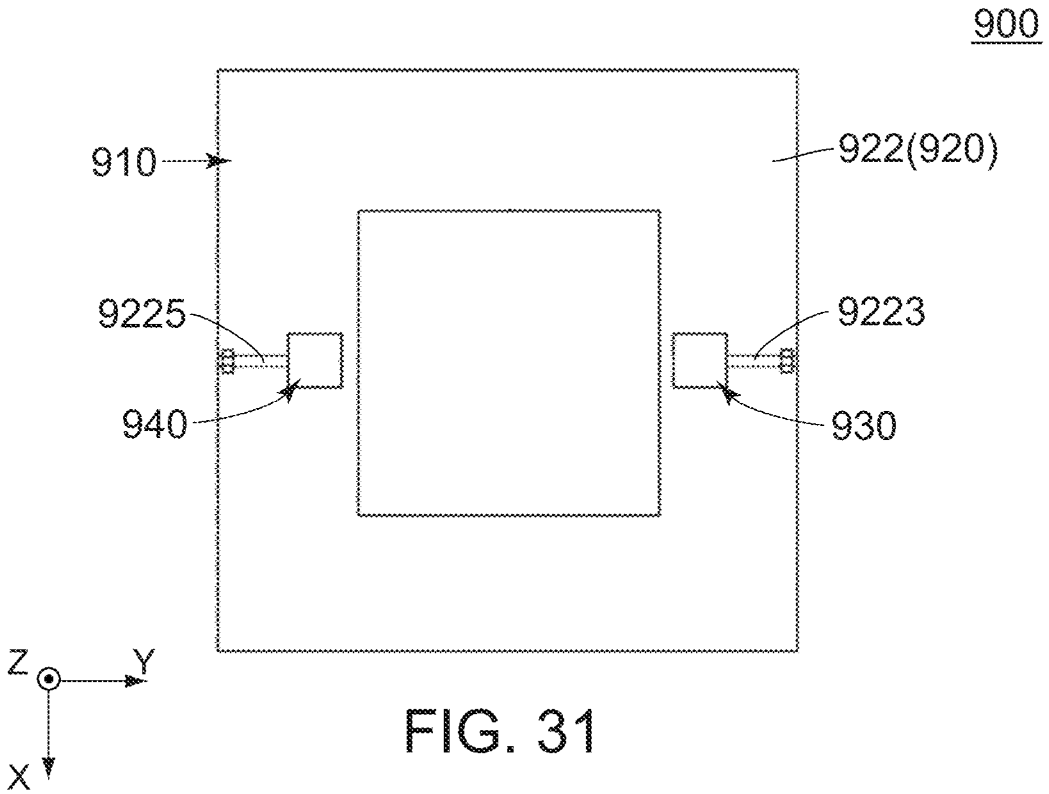
FIG. 31 is a top view showing an antenna device of Patent Document 1.
Figure 32:
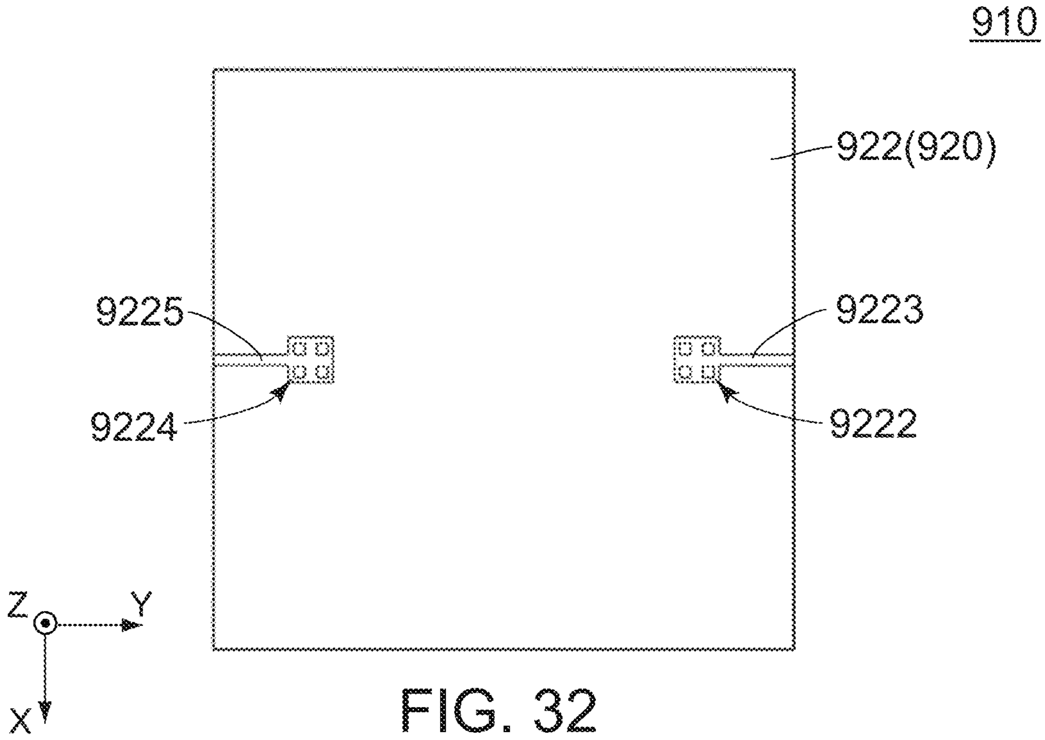
FIG. 32 is a top view showing a circuit board which is included in the antenna device of FIG. 31.

As shown in FIG. 30, an antenna device 10F according to a fifth embodiment of the present invention comprises a circuit board 500F, a coil antenna 100 and a resonance circuit. The coil antenna 100 of the present embodiment has a structure same as that of the coil antenna 100 of the first embodiment, and detail explanation thereabout will be omitted. As for directions and orientations in the present embodiment, expressions same as those of the first embodiment will be used hereinbelow.

As shown in FIG. 30, the circuit board 500F of the present embodiment has a conductive portion 510F with a flat shape. In more detail, the conductive portion 510F is a ground conductor. Specifically, the circuit board 500F is configured so that a conductive layer, which functions as the conductive portion 510F, is laminated on an insulating substrate such as a glass epoxy substrate.

As shown in FIG. 30, the conductive portion 510F is formed with an opening 512 and a slit 514F. The conductive portion 510F has a first path which goes around the opening 512 and the slit 514F. The first path forms a part of the resonance circuit. The opening 512 of the present embodiment has a structure same as that of the opening 512 of the first embodiment, and detail explanation thereabout will be omitted.

As shown in FIG. 30, similar to the opening 512, the slit 514F of the present embodiment is a part of the circuit board 500F which has no conductive pattern. The slit 514F is coupled with the opening 512. The slit 514F extends from the opening 512.

As shown in FIG. 30, a width of the slit 514F is smaller than a diameter of the opening 512. However, the present invention is not limited thereto, but the width of the slit 514F may be equal to the diameter of the opening 512, or the width of the slit 514F may be greater than the diameter of the opening 512. It is noted that an increase of the width of the slit 514F enlarges a current loop, which is formed around the slit 514F, so that a communication range of the antenna device 10F is increased.

As shown in FIG. 30, the conductive portion 510F is further formed with an additional opening 516.

As shown in FIG. 30, the additional opening 516 of the present embodiment is a hole piercing the circuit board 500F. In other words, the additional opening 516 pierces the circuit board 500F in the up-down direction. However, the present invention is not limited thereto, but the additional opening 516 may be a part of the circuit board 500F, which has no conductive pattern, similar to the opening 512. The additional opening 516 is positioned rearward of the opening 512 in the front-rear direction. In a plane perpendicular to the up-down direction, the additional opening 516 is greater than the opening 512. The conductive portion 510F has a second path which goes around the additional opening 516. The second path forms a part of the resonance circuit. The slit 514F is coupled with both of the opening 512 and the additional opening 516.

As shown in FIG. 30, the conductive portion 510F is further formed with an additional slit 518.

As shown in FIG. 30, the additional slit 518 of the present embodiment is a part of the circuit board 500F, which has no conductive pattern, similar to the opening 512. The additional slit 518 is coupled with the slit 514F. The additional slit 518 extends in the right-left direction from the slit 514F. The additional slit 518 communicates with the outside of the conductive portion 510F in the plane perpendicular to the up-down direction. In the plane perpendicular to the up-down direction, the slit 514F communicates with the outside of the conductive portion 510F via the additional slit 518. All of the opening 512, the slit 514F, the additional opening 516 and the additional slit 518 are coupled to one another.

As shown in FIG. 30, a width of the additional slit 518 is equal to the width of the slit 514F. However, the present invention is not limited thereto, but the width of the additional slit 518 may be smaller than the width of the slit 514F or may be greater than the width of the slit 514F.

As shown in FIG. 30, the circuit board 500F has an edge 520.

As shown in FIG. 30, the edge 520 defines an outer edge of the circuit board 500F. Specifically, the edge 520 defines the outer edge of the circuit board 500F in a direction perpendicular to the up-down direction. The additional slit 518 extends toward the edge 520. Specifically, the additional slit 518 extends from the slit 514F toward the edge 520. The additional slit 518 reaches the edge 520.

Referring to FIG. 30, the coil antenna 100 is mounted on the circuit board 500F so that the coil antenna 100 at least overlaps with the opening 512 when the coil antenna 100 is viewed along the up-down direction perpendicular to the circuit board 500F. The coil antenna 100 is mounted on the circuit board 500F so that the coil antenna 100 does not overlap with the additional opening 516 when the coil antenna 100 is viewed along the up-down direction. The coil antenna 100 is surface-mounted on the circuit board 500F.

As shown in FIG. 30, the antenna device 10F further has capacitors 600F which form a part of the resonant circuit.

Referring to FIG. 30, the capacitors 600F form a current loop path together with a path which goes around the opening 512, the additional opening 516, the slit 514F and the additional slit 518 of the conductive portion 510F. In other words, the capacitors 600F form the resonant circuit together with the path which goes around the opening 512, the additional opening 516, the slit 514F and the additional slit 518 of the conductive portion 510F. A resonant frequency of the resonant circuit is a communication frequency band of the antenna device 10F. The capacitors 600F are mounted on the circuit board 500F so that each of the capacitors 600F is wired across the additional slit 518. However, the mounting locations of the capacitors 600F are not limited to those described above, but the capacitors 600F may be mounted at any locations on the conductive portion 510F, provided that the capacitors 600F and the path, which goes around the opening 512, the additional opening 516, the slit 514F and the additional slit 518 of the conductive portion 510F, form the current loop path.

Although the specific explanation about the present invention is made above referring to the embodiments, the present invention is not limited thereto and is susceptible to various modifications and alternative forms. In addition, the above embodiments and variations may also be combined.

Although each of the antenna devices 10, 10C of the aforementioned first and second embodiments is not provided with a portion equivalent to the additional opening 516 of each of the antenna devices 10D, 10E, 10F of the third, fourth and fifth embodiments, the present invention is not limited thereto. Specifically, the antenna device 10, 10C may also be provided with an additional opening 516 which forms a part of the slit 514, 514C.

The present application is based on a Japanese patent applications of JP2022-074955 filed before the Japan Patent Office on Apr. 28, 2022 and JP2022-118580 filed before the Japan Patent Office on Jul. 26, 2022, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST

10, 10C, 10D, 10E, 10F antenna device
100, 100A, 100B coil antenna
200 coil
210 upper end
220 lower end
230 outer periphery
240 inner periphery
300, 300A, 300B magnetic core
310 center core
320, 320B upper portion
340 side portion
400 terminal
500, 500C, 500D, 500E, 500F circuit board
510, 510C, 510D, 510E, 510F conductive portion
512 opening
514, 514C, 514D, 514E, 514F slit
5142 first portion
5144 second portion
5146 third portion
516 additional opening
518 additional slit
520 edge
600, 600D, 600E, 600F capacitor
700, 700A molded resinous member
AX winding axis
PP predetermined portion
SR specific region

The invention claimed is:

1. An antenna device comprising a circuit board, a coil antenna and a resonance circuit, wherein:

the circuit board has a conductive portion with a flat shape;

the conductive portion is formed with an opening and a slit;

the conductive portion has a first path which goes around the opening and the slit;

the first path forms a part of the resonance circuit;

the slit is coupled with the opening;

the coil antenna is mounted on the circuit board so that the coil antenna at least overlaps with the opening when the coil antenna is viewed along an up-down direction perpendicular to the circuit board;

the coil antenna comprises a coil and a magnetic core;

the coil has a winding axis extending in the up-down direction;

the magnetic core partially forms a magnetic path of the coil;

the magnetic core is positioned at a region excluding a specific region which is positioned just below the coil in the up-down direction toward the circuit board;

the magnetic core at least has a center core;

the center core is at least partially positioned inside the coil;

the conductive portion is further formed with an additional opening;

the conductive portion has a second path which goes around the additional opening;

the second path forms a part of the resonance circuit;

the slit is coupled to the additional opening, in addition to the opening; and the coil antenna is mounted on the circuit board so that the coil antenna does not overlap with the additional opening when the coil antenna is viewed along the up-down direction.

2. The antenna device as recited in claim 1, wherein:

the circuit board has an edge; and the slit extends toward the edge.

3. The antenna device as recited in claim 1, wherein:

the circuit board has an edge;

the conductive portion is further formed with an additional slit;

the additional slit extends toward the edge;

the antenna device further has a capacitor which forms a part of the resonance circuit; and the capacitor is mounted on the circuit board so that the capacitor is wired across the additional slit.

4. The antenna device as recited in claim 3, wherein all of the opening, the slit, the additional opening and the additional slit are coupled to one another.

5. The antenna device as recited in claim 1, wherein:

the coil has a lower end in the up-down direction; and the center core extends downward in the up-down direction beyond the lower end.

6. The antenna device as recited in claim 1, wherein:

the coil has an upper end in the up-down direction; and the center core extends upward in the up-down direction beyond the upper end.

7. The antenna device as recited in claim 6, wherein:

the coil has an outer periphery;

the magnetic core further has an upper portion;

the upper portion extends from the center core toward the outer periphery; and the upper portion overlaps with the coil when the upper portion is viewed in the up-down direction.

8. The antenna device as recited in claim 7, wherein:

the magnetic core further has a side portion;

the side portion is positioned outside the coil in a plane perpendicular to the up-down direction; and the side portion extends downward in the up-down direction from the upper portion.

9. The antenna device as recited in claim 1, wherein:

the circuit board has an edge;

the slit has a predetermined portion; and the predetermined portion extends along the edge in the vicinity of the edge.

10. The antenna device as recited in claim 9, wherein:

the antenna device further has a capacitor which forms a part of the resonance circuit; and the capacitor is mounted on the circuit board at its region between the edge and the slit.

11. The antenna device as recited in claim 9, wherein:

the slit has a first portion and a second portion;

the first portion extends from the opening toward the edge;

the second portion extends from the first portion in a direction intersecting with the first portion; and the second portion functions as the predetermined portion.

12. The antenna device as recited in claim 11, wherein:

the slit further comprises a third portion; and the third portion extends from the second portion in a direction intersecting with the second portion.

13. The antenna device as recited in claim 1, wherein:

the coil has an inner periphery; and

S1 and S2 satisfy $1 \leq S2/S1 \leq 2$, where S1 is a cross-sectional area of the inner periphery of the coil, and S2 is an area of the opening.

14. An antenna device comprising a circuit board, a coil antenna and a resonance circuit, wherein:

the circuit board has a conductive portion with a flat shape;

the conductive portion is formed with an opening and a slit;

the conductive portion has a first path which goes around the opening and the slit;

the first path forms a part of the resonance circuit;

the slit is coupled with the opening;

the coil antenna is mounted on the circuit board so that the coil antenna at least overlaps with the opening when the coil antenna is viewed along an up-down direction perpendicular to the circuit board;

the coil antenna comprises a coil and a magnetic core;

the coil has a winding axis extending in the up-down direction;

the magnetic core partially forms a magnetic path of the coil;

the magnetic core is positioned at a region excluding a specific region which is positioned just below the coil in the up-down direction toward the circuit board;

the magnetic core at least has a center core;

the center core is at least partially positioned inside the coil;

the circuit board has an edge;

the slit has a predetermined portion;

the predetermined portion of the slit extends along the edge of the circuit board in the vicinity of the edge of the circuit board;

the antenna device further has a capacitor which forms a part of the resonance circuit; and the capacitor is mounted on the circuit board at its region between the edge of the circuit board and the slit.

15. An antenna device comprising a circuit board, a coil antenna and a resonance circuit, wherein:

the circuit board has a conductive portion with a flat shape;

the conductive portion is formed with an opening and a slit;

the conductive portion has a first path which goes around the opening and the slit;

the first path forms a part of the resonance circuit;

the slit is coupled with the opening;

the coil antenna is mounted on the circuit board so that the coil antenna at least overlaps with the opening when the coil antenna is viewed along an up-down direction perpendicular to the circuit board;

the coil antenna comprises a coil and a magnetic core;

the coil has a winding axis extending in the up-down direction;

the magnetic core partially forms a magnetic path of the coil;

the magnetic core is positioned at a region excluding a specific region which is positioned just below the coil in the up-down direction toward the circuit board;

the magnetic core at least has a center core;

the center core is at least partially positioned inside the coil;

the circuit board has an edge;

the slit has a predetermined portion;

the predetermined portion of the slit extends along the edge of the circuit board in the vicinity of the edge of the circuit board;

the slit has a first portion and a second portion;

the first portion extends from the opening toward the edge;

the second portion extends from the first portion in a direction intersecting with the first portion; and the second portion functions as the predetermined portion.

16. The antenna device as recited in claim 15, wherein:

the slit further comprises a third portion; and the third portion of the slit extends from the second portion of the slit in a direction intersecting with the second portion of the slit.

* * * * *